United States Patent
Hwang et al.

(10) Patent No.: US 12,015,509 B2
(45) Date of Patent: *Jun. 18, 2024

(54) METHOD FOR TRANSMITTING DMRS IN WIRELESS COMMUNICATION SYSTEM SUPPORTING NB-IoT AND APPARATUS THEREFOR

(71) Applicant: LG ELECTRONICS INC., Seoul (KR)

(72) Inventors: Seunggye Hwang, Seoul (KR); Hyunsoo Ko, Seoul (KR); Yunjung Yi, Seoul (KR); Bonghoe Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

This patent is subject to a terminal disclaimer.

(21) Appl. No.: 17/844,503

(22) Filed: Jun. 20, 2022

(65) Prior Publication Data

US 2022/0329468 A1    Oct. 13, 2022

Related U.S. Application Data

(63) Continuation of application No. 17/081,330, filed on Oct. 27, 2020, now Pat. No. 11,394,590, which is a
(Continued)

(51) Int. Cl.
*H04L 27/00* (2006.01)
*H04L 1/00* (2006.01)
(Continued)

(52) U.S. Cl.
CPC ........ *H04L 27/0008* (2013.01); *H04L 1/0061* (2013.01); *H04L 5/0007* (2013.01);
(Continued)

(58) Field of Classification Search
CPC . H04L 5/00; H04L 5/005; H04L 27/34; H04L 27/22; H04L 27/2607;
(Continued)

(56) References Cited

U.S. PATENT DOCUMENTS

2004/0114671 A1* 6/2004 Inogai ..................... H04L 5/026
                                                      375/146
2014/0247799 A1  9/2014 Suzuki et al.
(Continued)

OTHER PUBLICATIONS

United States Patent and Trademark Office U.S. Appl. No. 16/075,128, Final Office Action dated Mar. 27, 2020, 18 pages.
(Continued)

*Primary Examiner* — Jianye Wu
(74) *Attorney, Agent, or Firm* — LEE, HONG, DEGERMAN, KANG & WAIMEY

(57) ABSTRACT

The present specification relates to a method for transmitting, by a terminal, a demodulation reference signal (DMRS) in a wireless communication system supporting narrowband (NB)-Internet of things (IOT), the method comprising: generating, for single tone transmission, a reference signal sequence to be used for demodulation; mapping the reference signal sequence to a plurality of symbols; and transmitting, in the plurality of symbols, the demodulation reference signal to a base station by using a single tone, wherein phase rotation is applied to each of the plurality of symbols.

12 Claims, 36 Drawing Sheets

Related U.S. Application Data continuation of application No. 16/075,128, filed as application No. PCT/KR2017/001118 on Feb. 2, 2017, now Pat. No. 10,848,356.

(60) Provisional application No. 62/339,102, filed on May 20, 2016, provisional application No. 62/305,527, filed on Mar. 8, 2016, provisional application No. 62/295,457, filed on Feb. 15, 2016, provisional application No. 62/294,309, filed on Feb. 12, 2016, provisional application No. 62/289,914, filed on Feb. 2, 2016.

(51) Int. Cl.
| | | |
|---|---|---|
| *H04L 1/1607* | (2023.01) | |
| *H04L 5/00* | (2006.01) | |
| *H04L 27/22* | (2006.01) | |
| *H04L 27/26* | (2006.01) | |
| *H04L 27/34* | (2006.01) | |
| *H04W 4/70* | (2018.01) | |
| *H04W 4/80* | (2018.01) | |
| *H04W 72/0446* | (2023.01) | |
| *H04W 72/0453* | (2023.01) | |
| *H04W 92/10* | (2009.01) | |

(52) U.S. Cl.
CPC ............ *H04L 5/005* (2013.01); *H04L 5/0051* (2013.01); *H04L 5/0083* (2013.01); *H04L 27/22* (2013.01); *H04L 27/2607* (2013.01); *H04L 27/2613* (2013.01); *H04L 27/2614* (2013.01); *H04L 27/3444* (2013.01); *H04W 4/70* (2018.02); *H04W 4/80* (2018.02); *H04W 72/0446* (2013.01); *H04W 72/0453* (2013.01); *H04W 92/10* (2013.01); *H04L 1/1664* (2013.01); *H04L 5/0062* (2013.01)

(58) Field of Classification Search
CPC ............. H04L 27/0008; H04L 27/2614; H04L 1/0061; H04W 72/04; H04W 72/0446; H04W 72/0453; H04W 4/80
See application file for complete search history.

(56) References Cited

U.S. PATENT DOCUMENTS

| | | |
|---|---|---|
| 2014/0293881 A1 | 10/2014 | Khoshnevis et al. |
| 2015/0156758 A1 | 6/2015 | Suzuki et al. |
| 2015/0289275 A1 | 10/2015 | Nakamura et al. |
| 2017/0201403 A1 | 7/2017 | Johansson et al. |
| 2017/0223743 A1 | 8/2017 | Lin et al. |
| 2018/0006763 A1 | 1/2018 | Kim et al. |
| 2019/0036746 A1 | 1/2019 | Hwang et al. |
| 2021/0044463 A1 | 2/2021 | Hwang et al. |

OTHER PUBLICATIONS

United States Patent and Trademark Office U.S. Appl. No. 17/081,330, Office Action dated Feb. 3, 2022, 10 pages.
PCT International Application No. PCT/KR2017/001118, International Search Report dated May 17, 2017, 3 pages.
ETRI, "Uplink DMRS design for NB-IoT", 3GPP TSG RAN WG1 NB-IoT Ad-Hoc Meeting, R1-160125, Feb. 2016, 5 pages.
Neul, et al., "PAPR reduction for single-tone PUSCH transmissions", 3GPP TSG RAN WG1 NB-IoT Ad-Hoc Meeting, R1-160100, Jan. 2016, 14 pages.
Qualcomm, "UL Design for NB-IoT", 3GPP TSG RAN WG1 Meeting #83, R1-157071, Nov. 2015, 8 pages.
Huawei, "NB-PUSCH design", 3GPP TSG RAN WG1 NB-IoT Ad-Hoc Meeting, R1-160034, Jan. 2016, 8 pages.
European Patent Office Application Serial No. 17747738.7, Search Report dated Aug. 6, 2019, 11 pages.
LG Electronics, "Discussion on PUSCH design for NB-IoT", 3GPP TSG RAN WG1 Meeting NB-IoT Ad-Hoc, R1-160122, XP051053442, Jan. 2016, 6 pages.
Huawei, et al., "Uplink frame structure design", 3GPP TSG RAN WG1 Meeting NB-IoT Ad-Hoc, R1-160038, XP051064677, Jan. 2016, 6 pages.

* cited by examiner

[Figure 1]
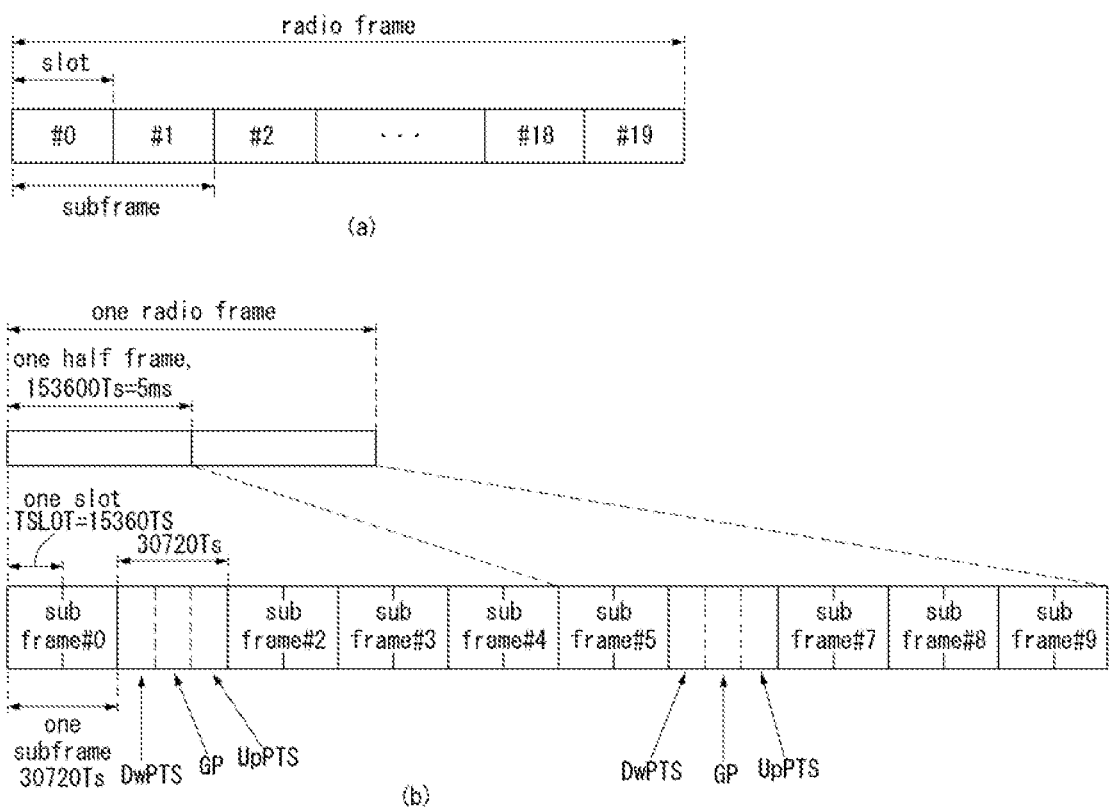

[Figure 2]
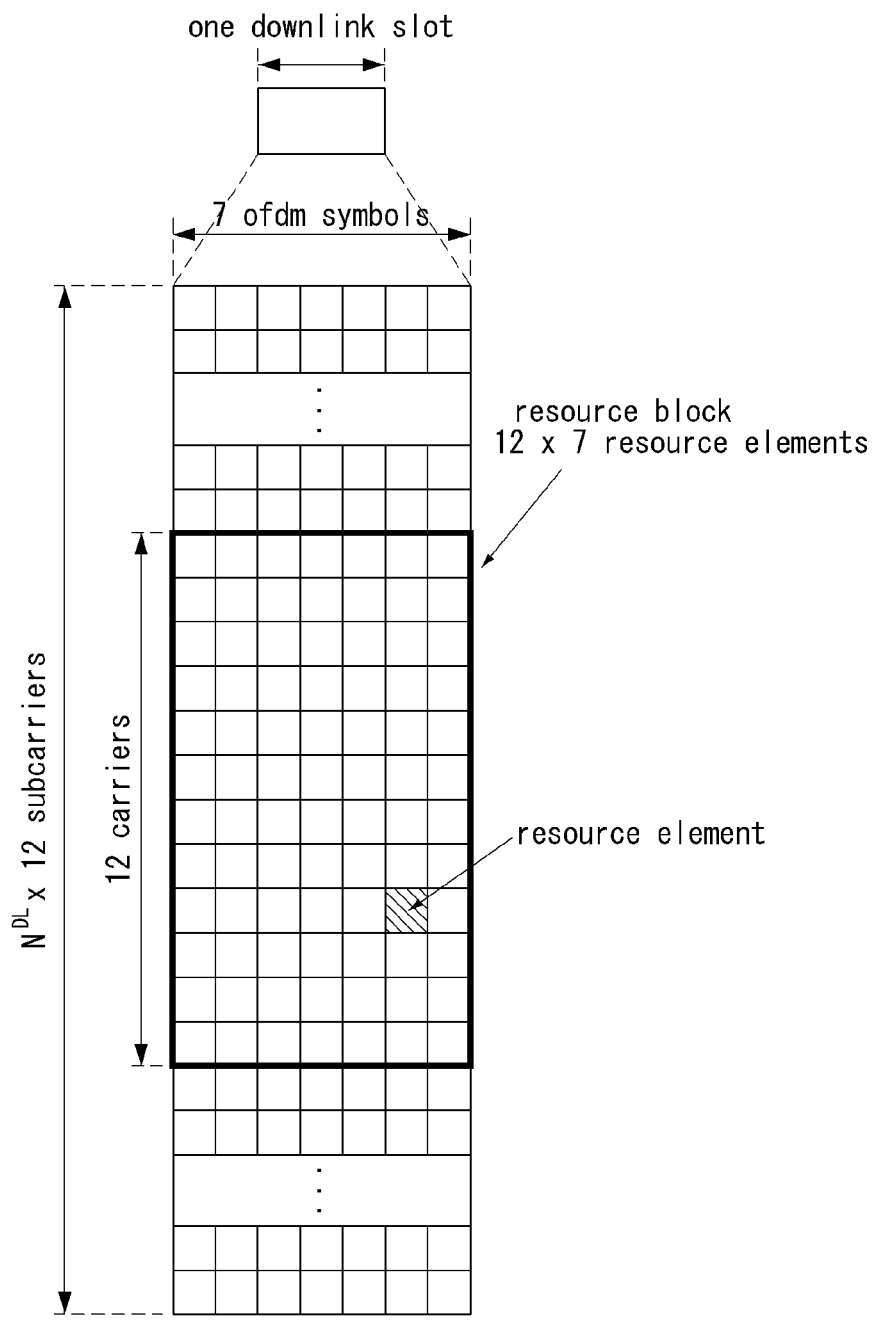

[Figure 3]
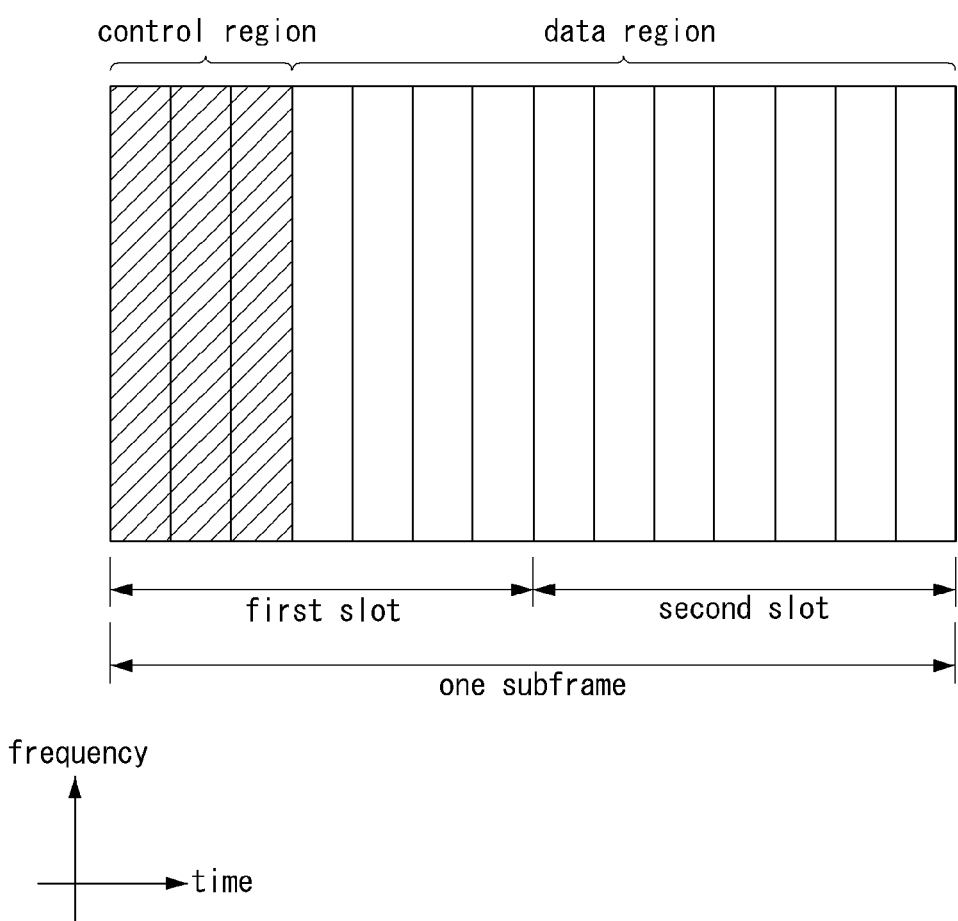

[Figure 4]
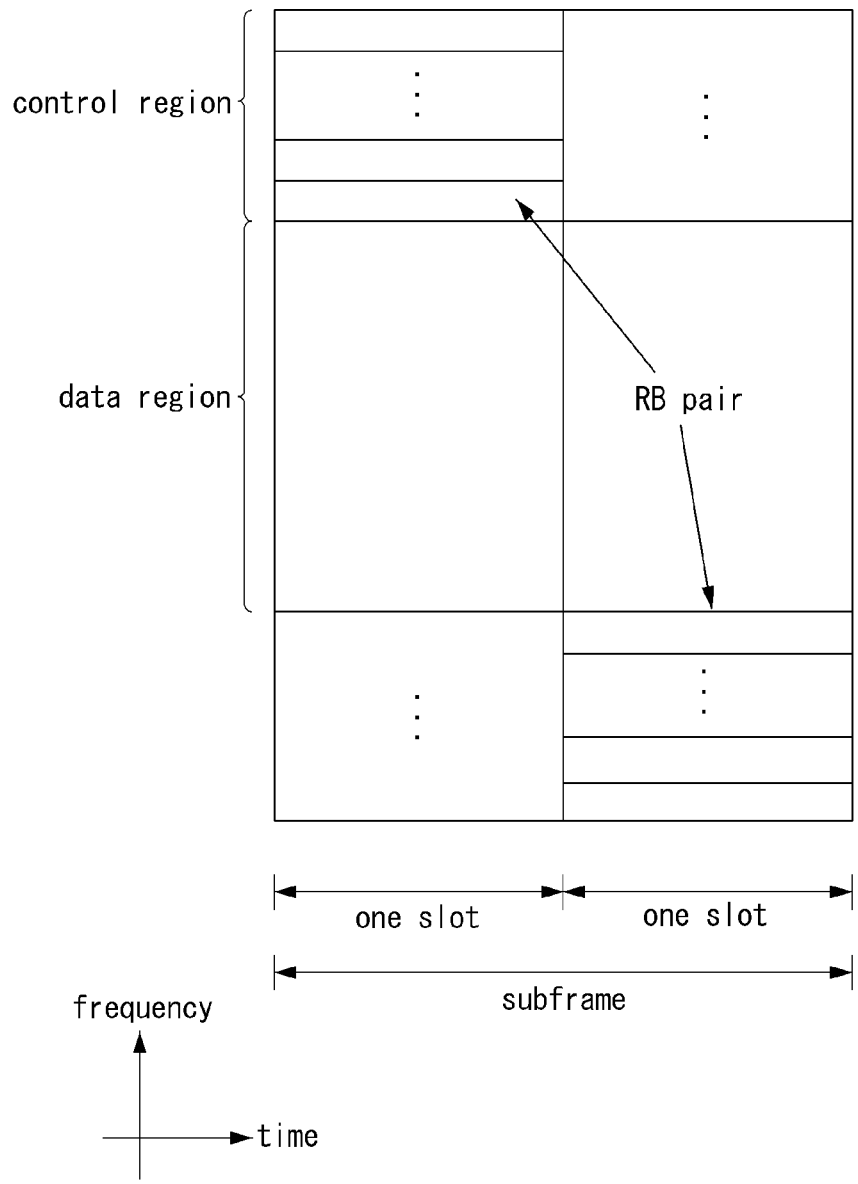

[Figure 5]
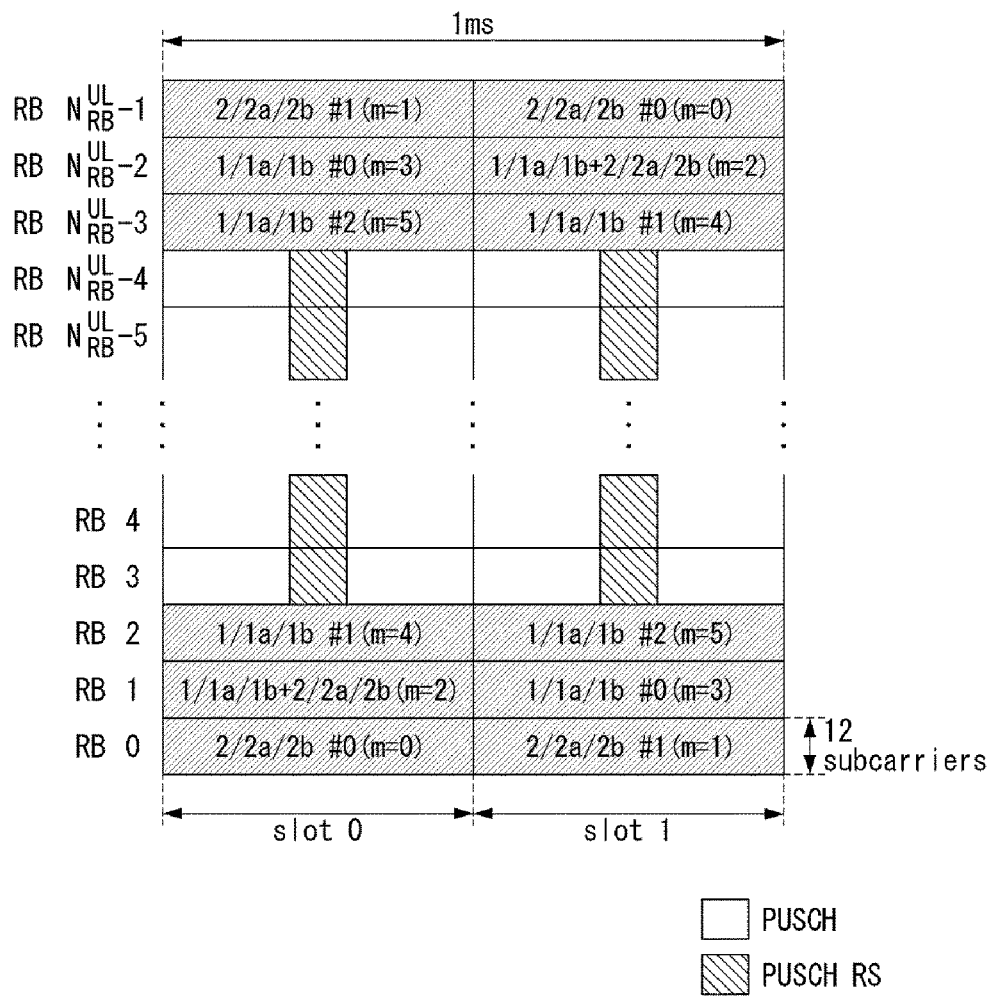

【Figure 6】
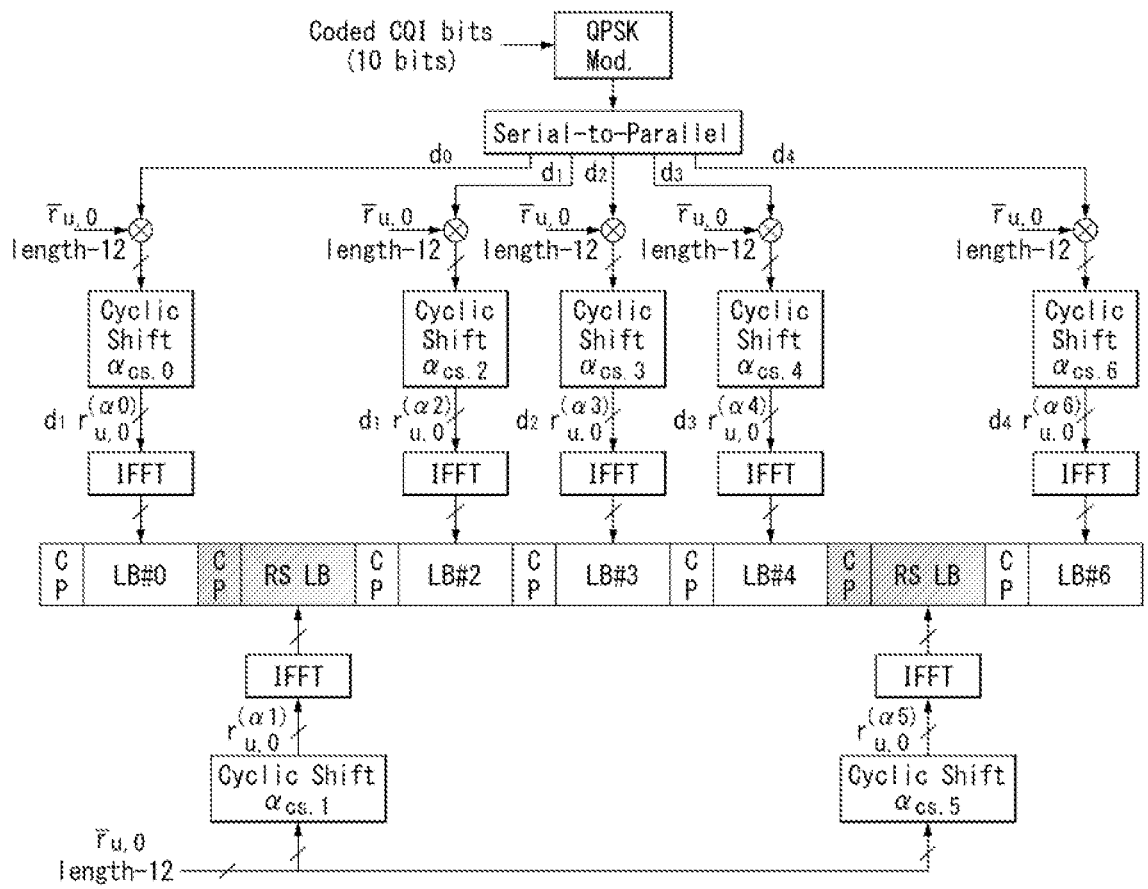

[Figure 7]
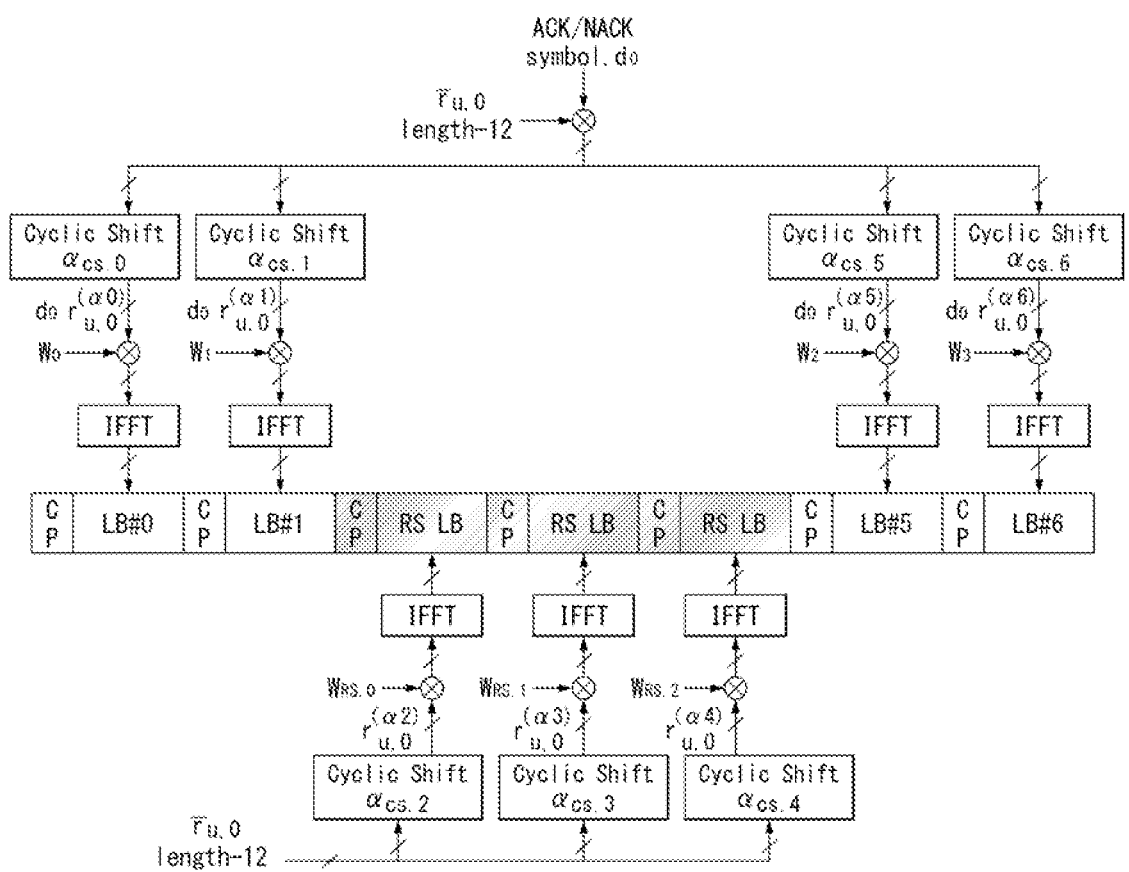

[Figure 8]
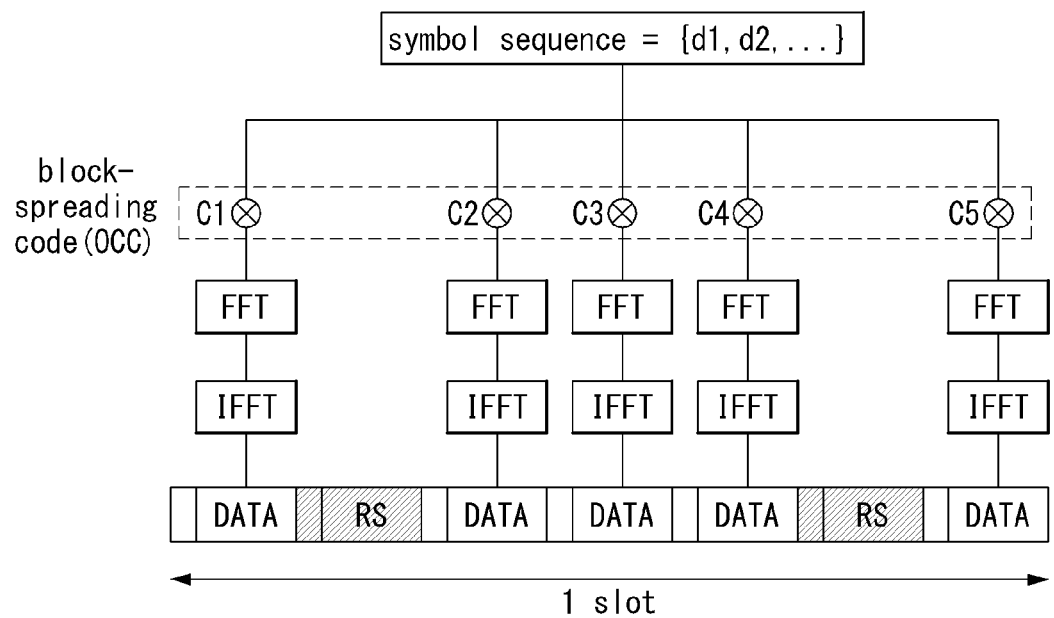

[Figure 9]
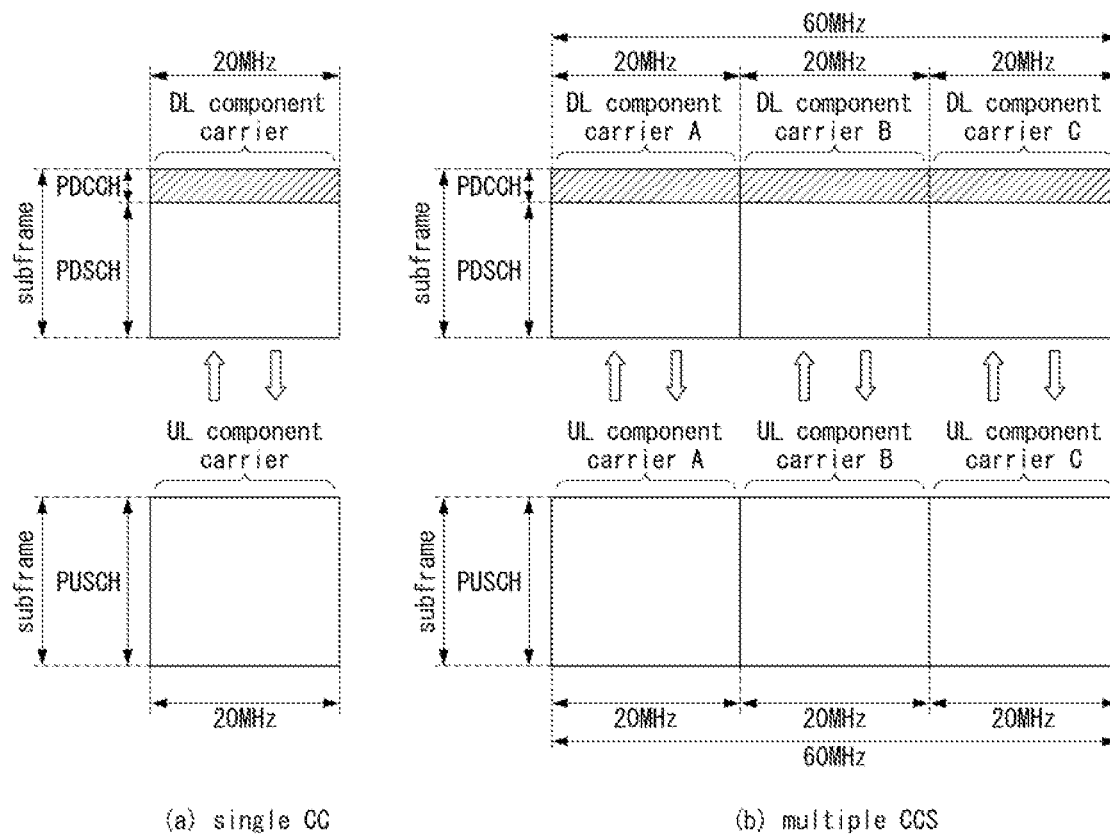
(a) single CC  (b) multiple CCS

【Figure 10】
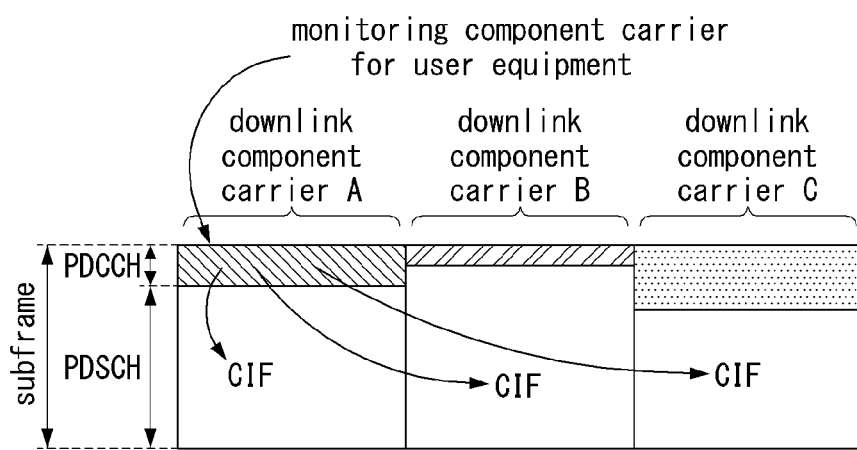
【Figure 11】
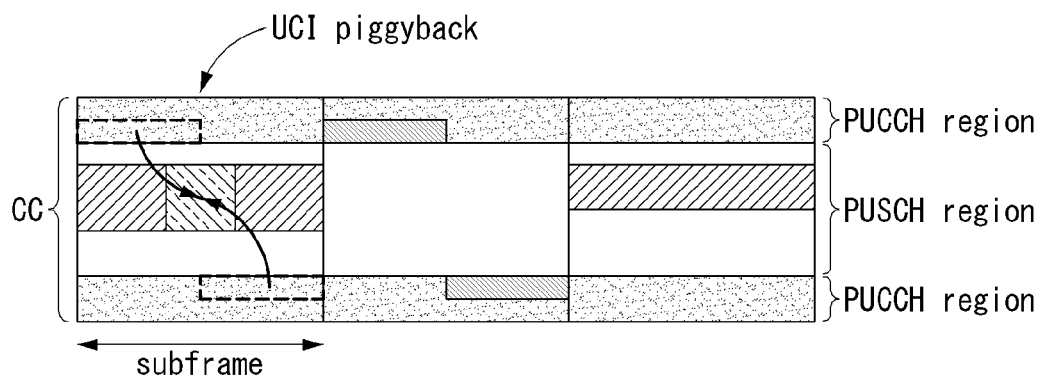

[Figure 12]
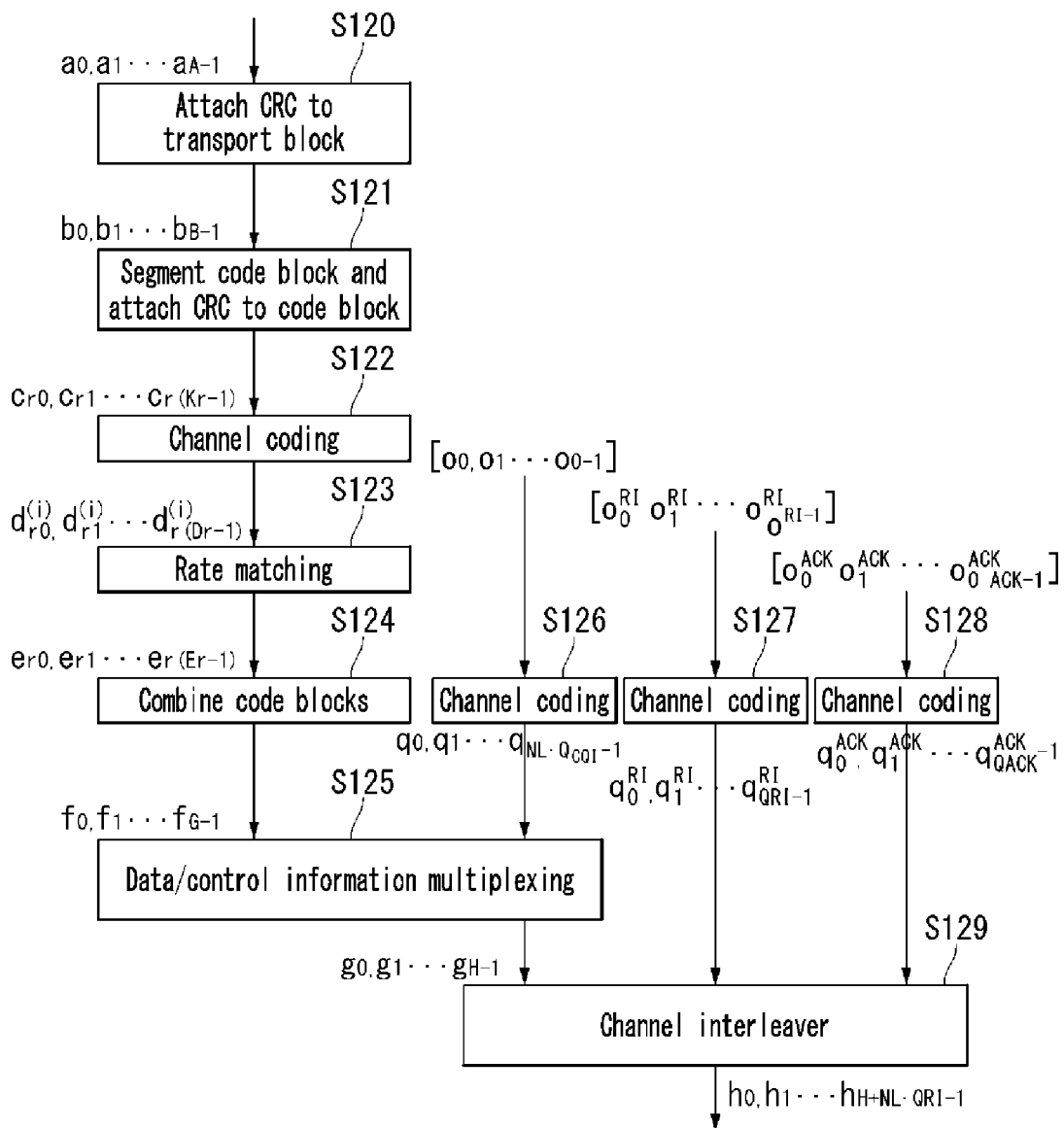

[Figure 13]
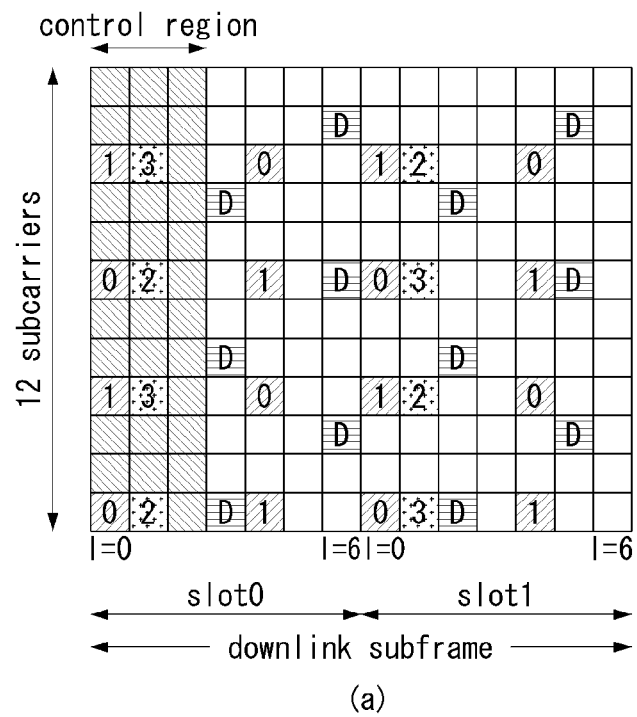
(a)
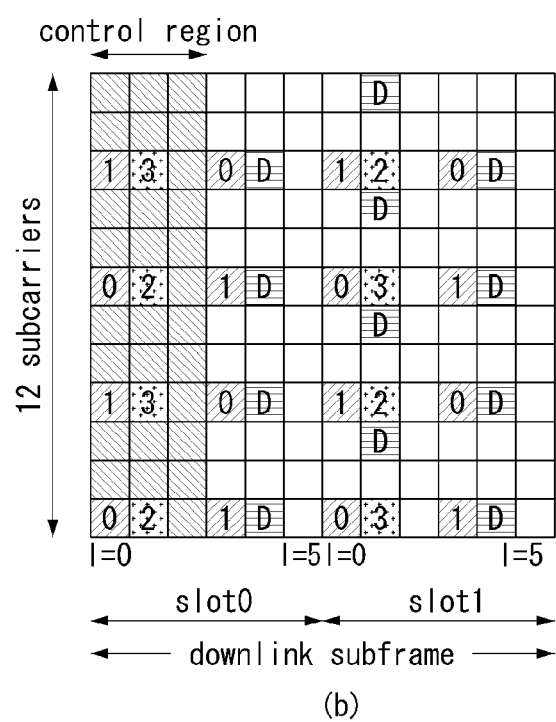
(b)

[Figure 14]
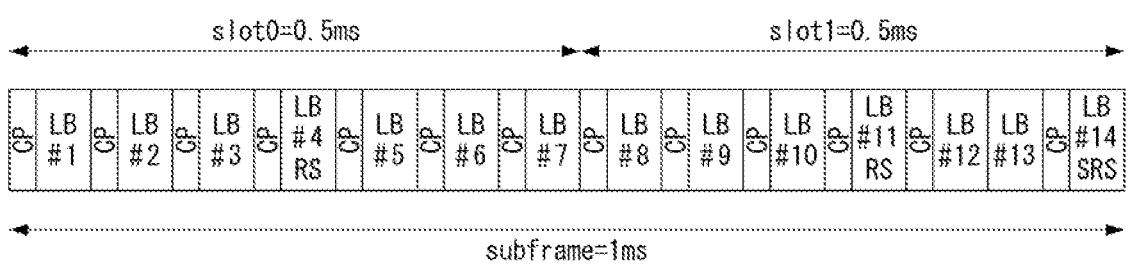

[Figure 15]
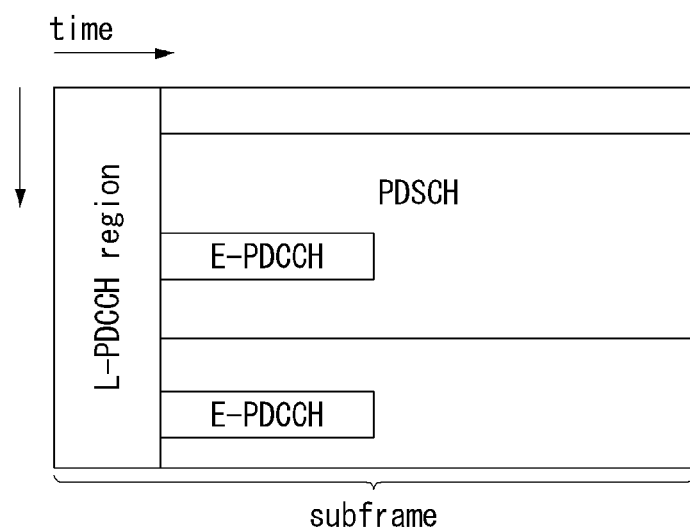

[Figure 16]
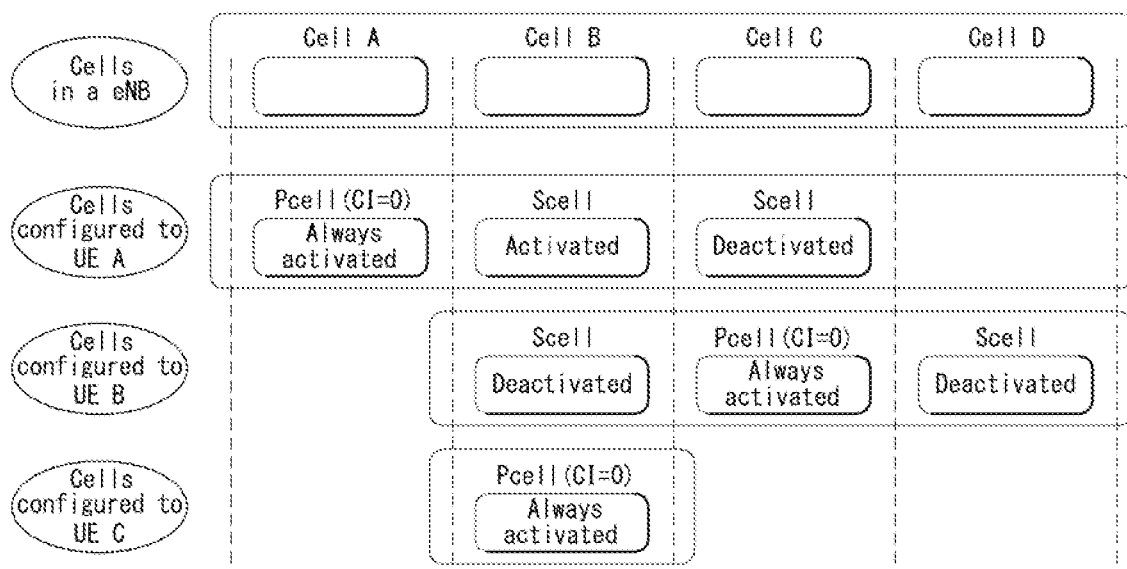

[Figure 17]
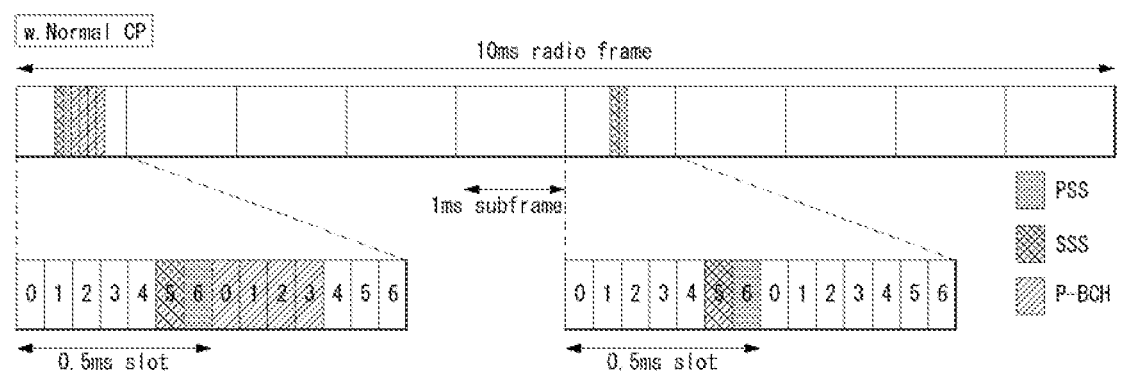

[Figure 18]
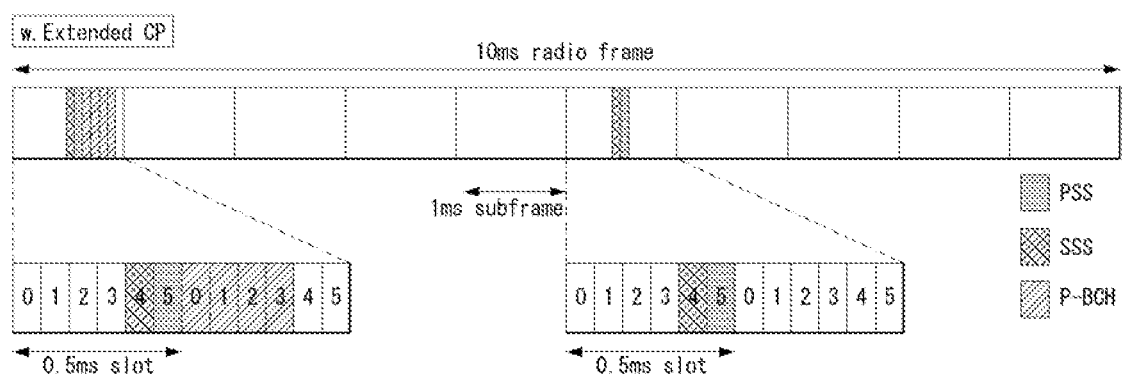

【Figure 19】
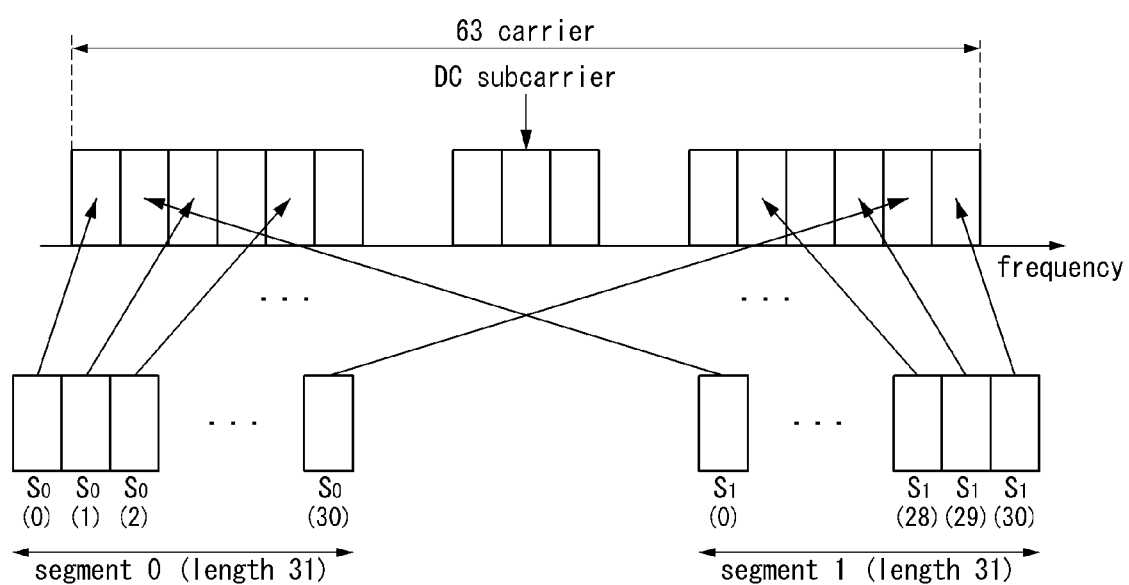

[Figure 20]
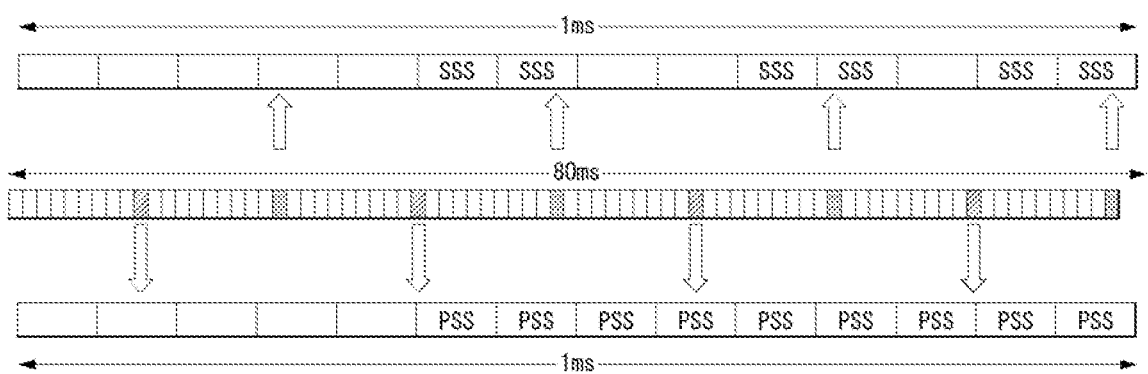

[Figure 21]
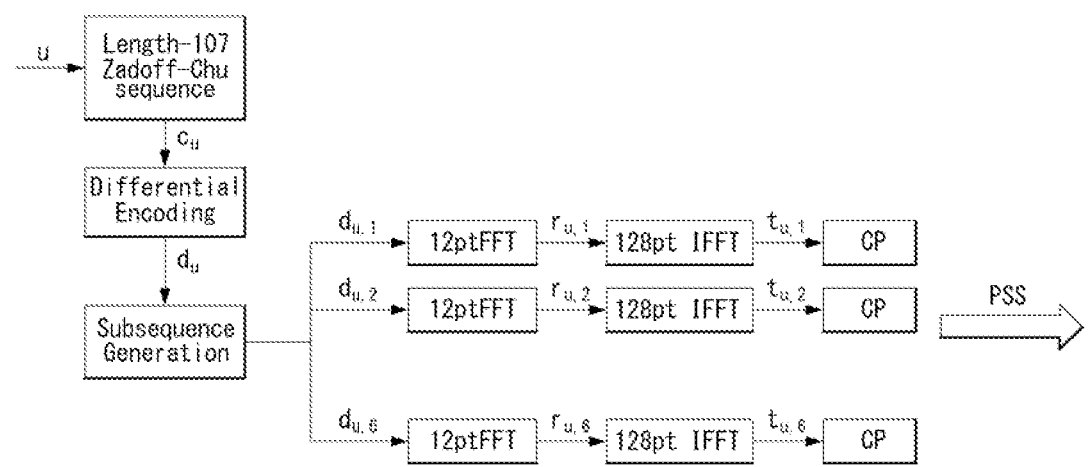

[Figure 22]
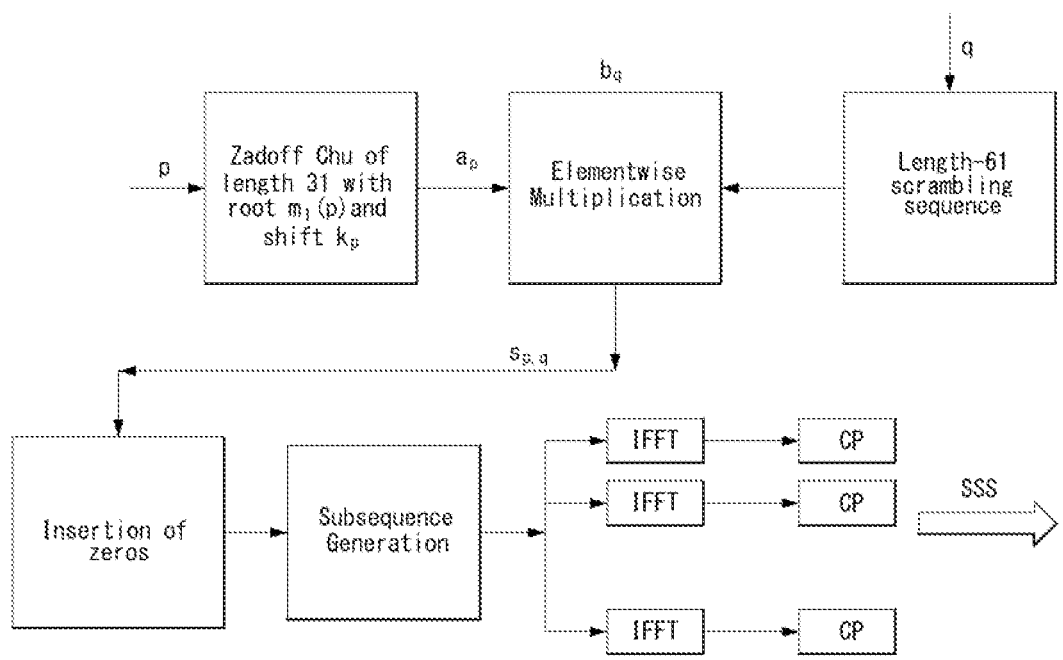

【Figure 23】
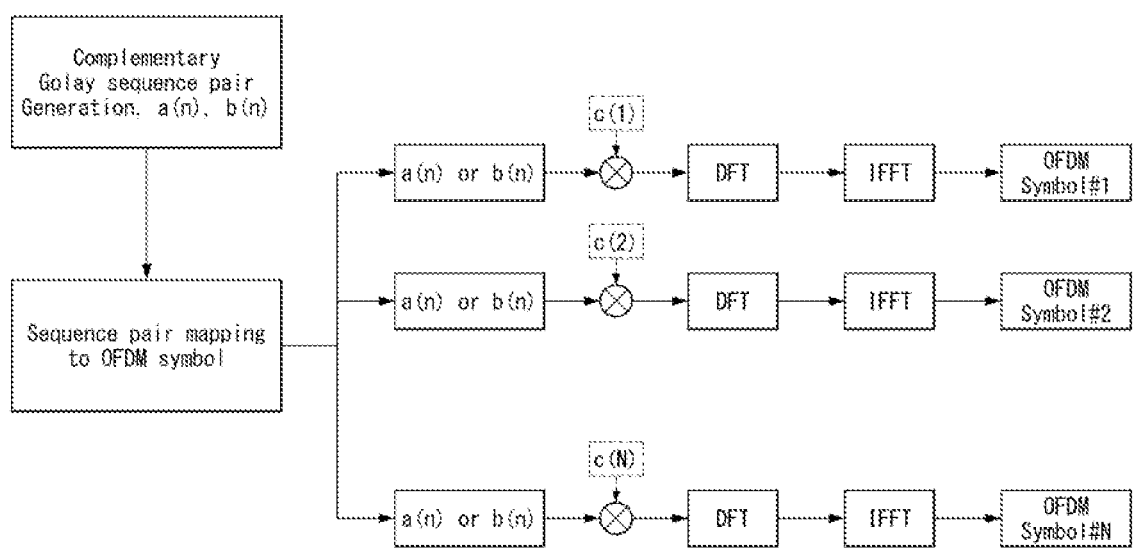

【Figure 24】
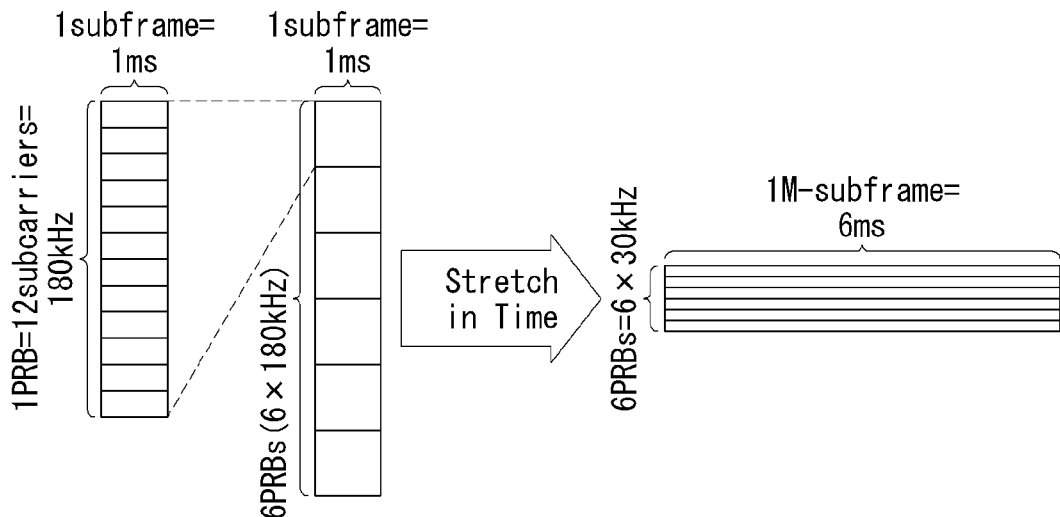
【Figure 25】
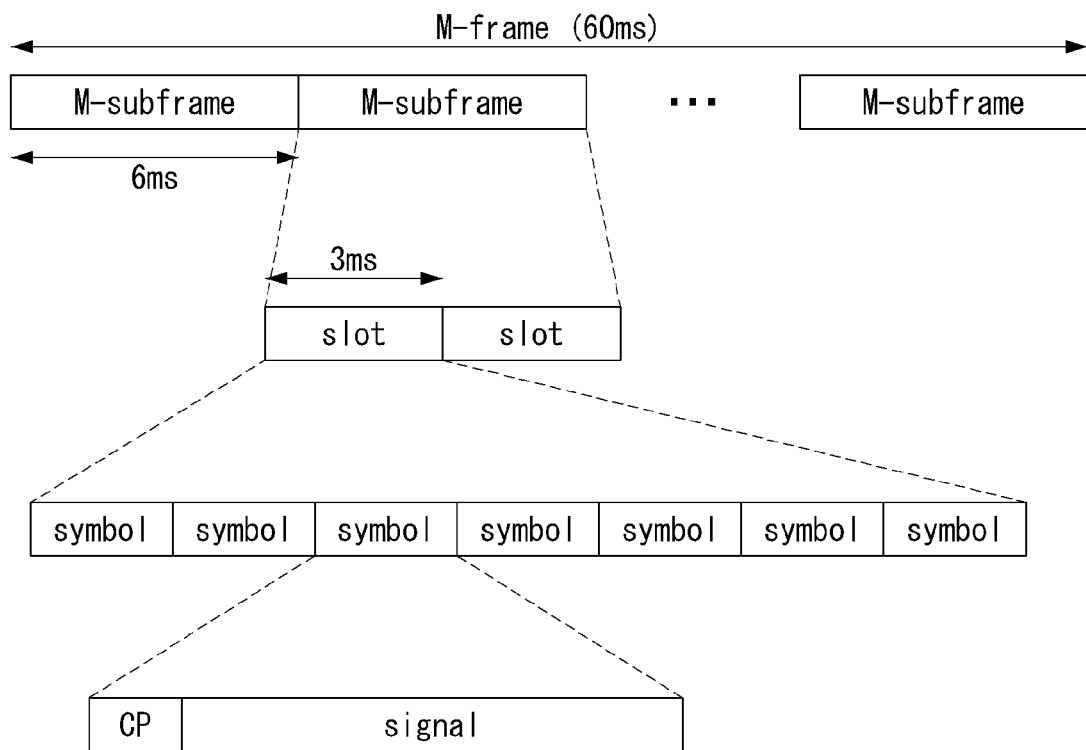

[Figure 26]
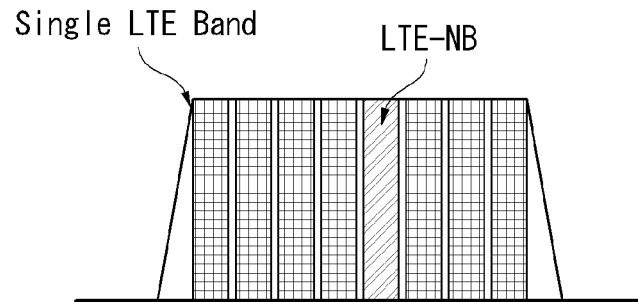
(a) In-band system
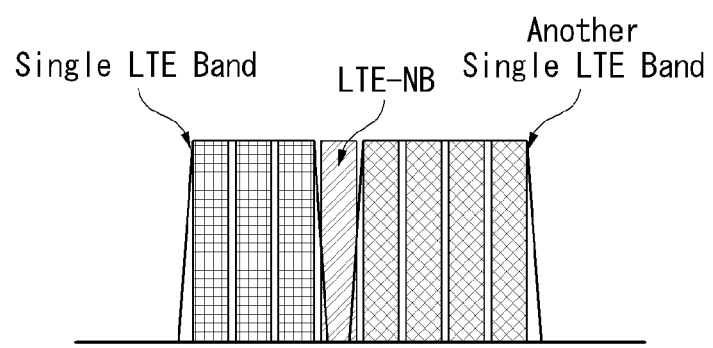
(b) Guard-band system
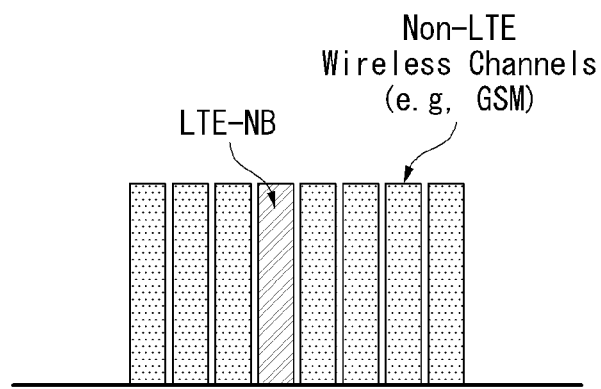
(c) Stand-alone system

[Figure 27]
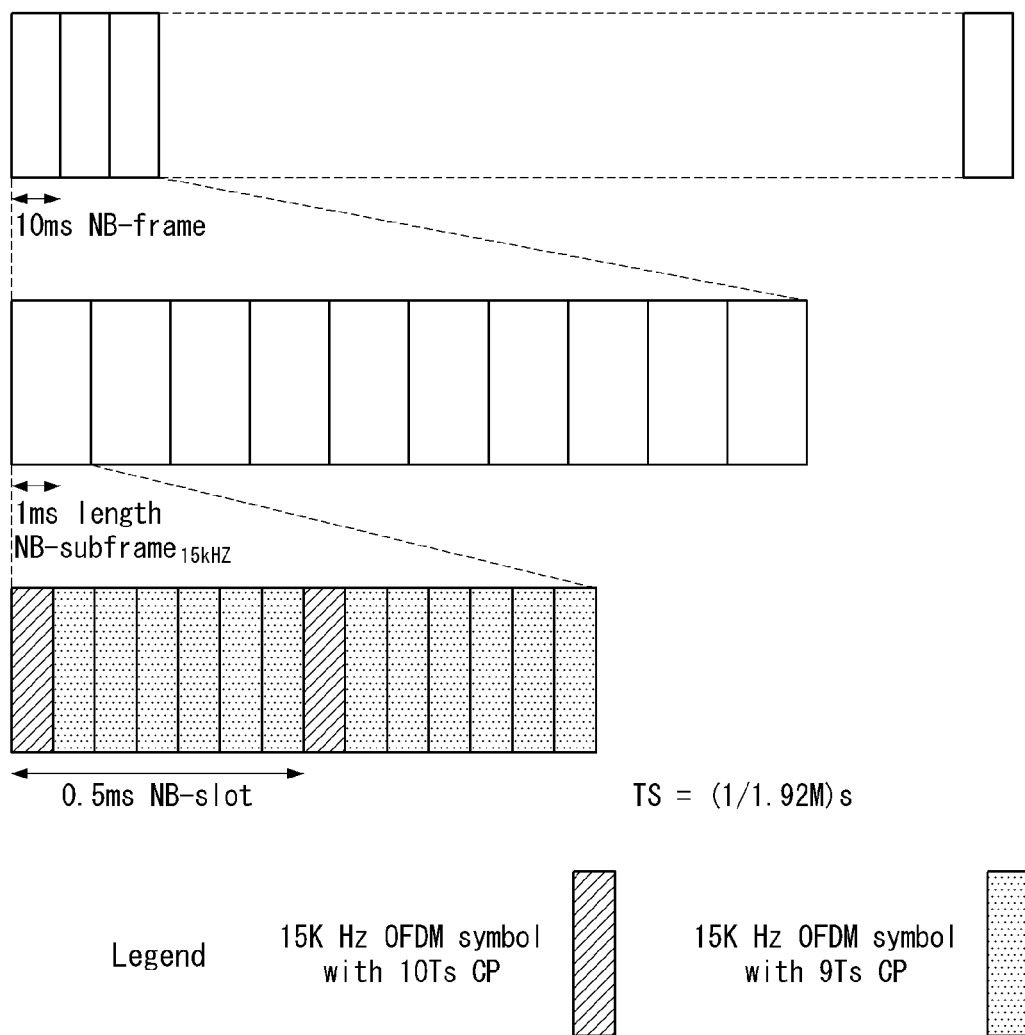

[Figure 28]
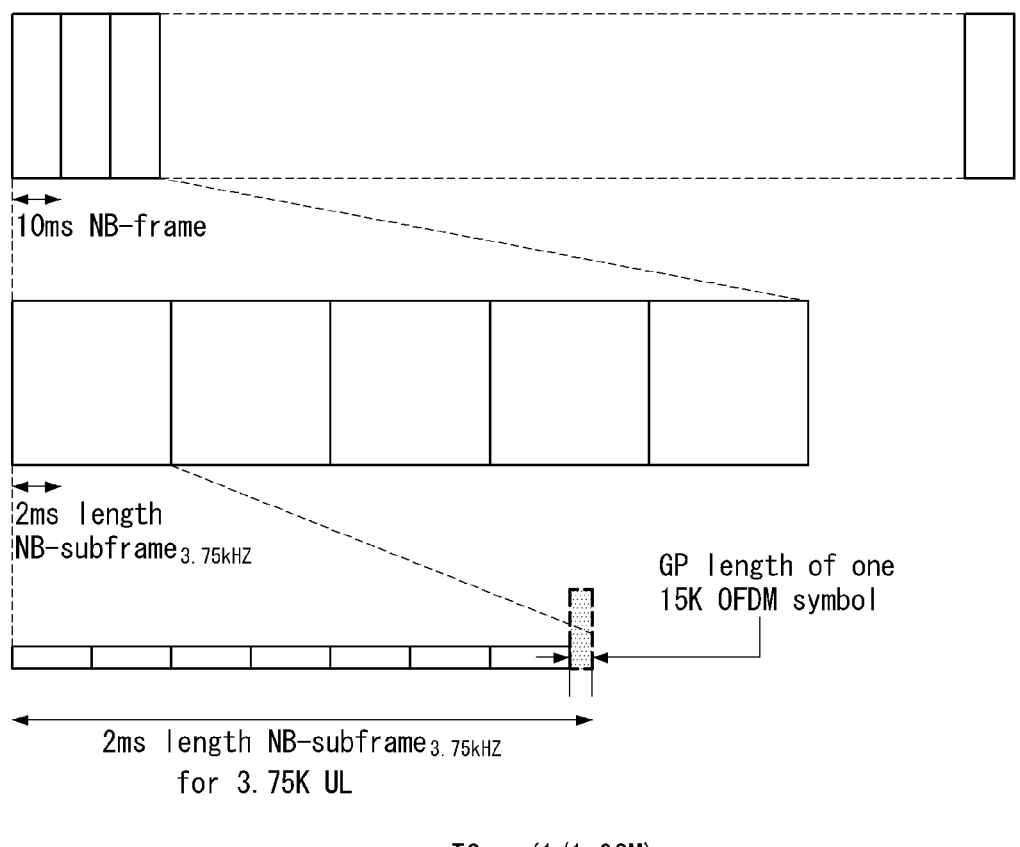

[Figure 29]
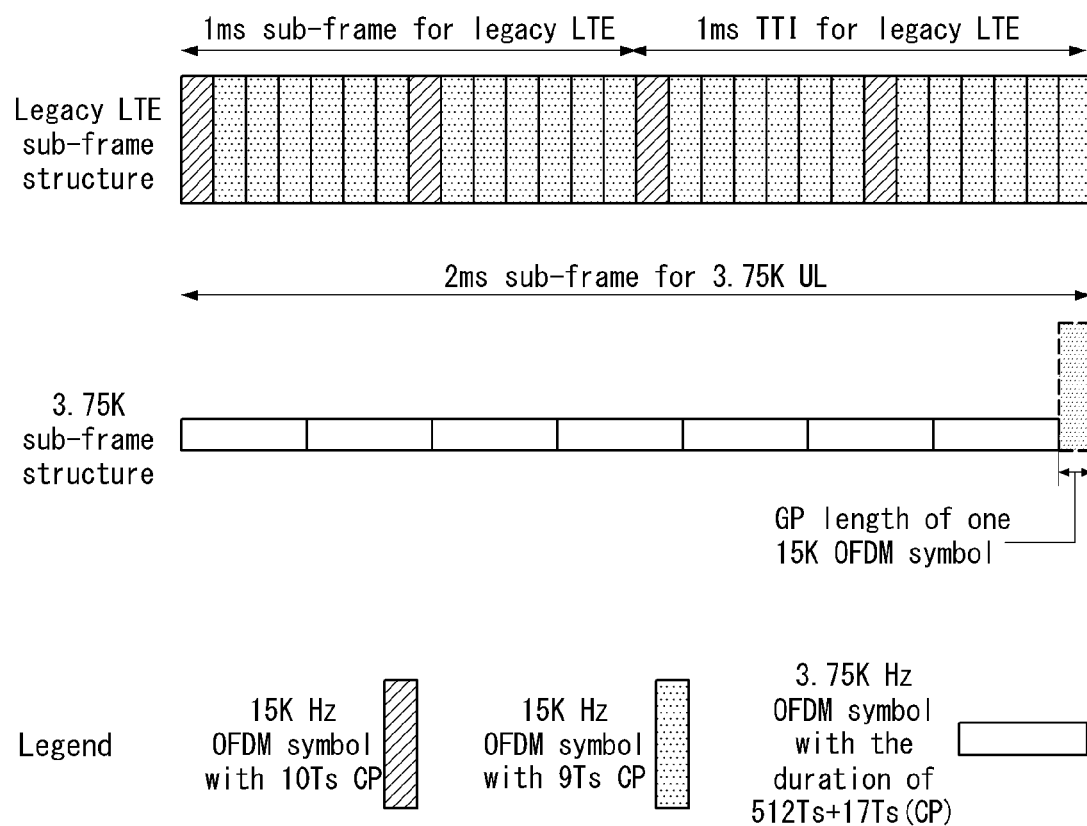

[Figure 30]
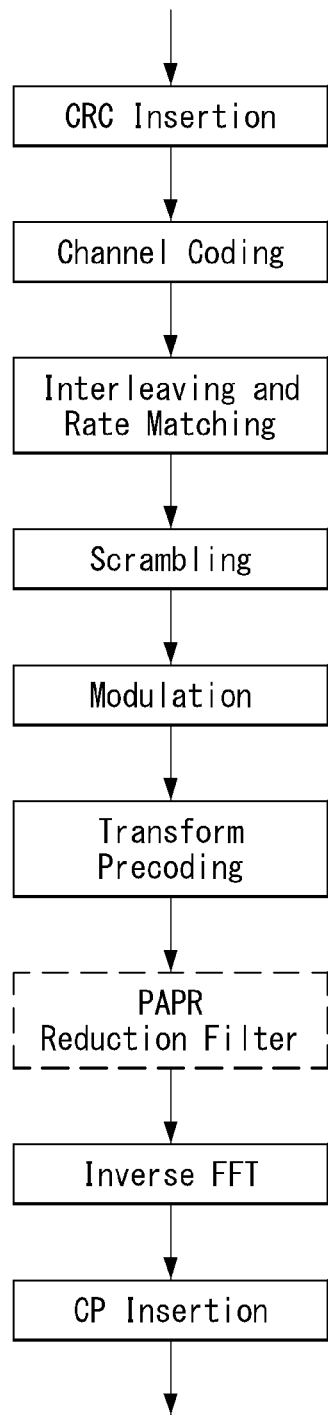

【Figure 31】
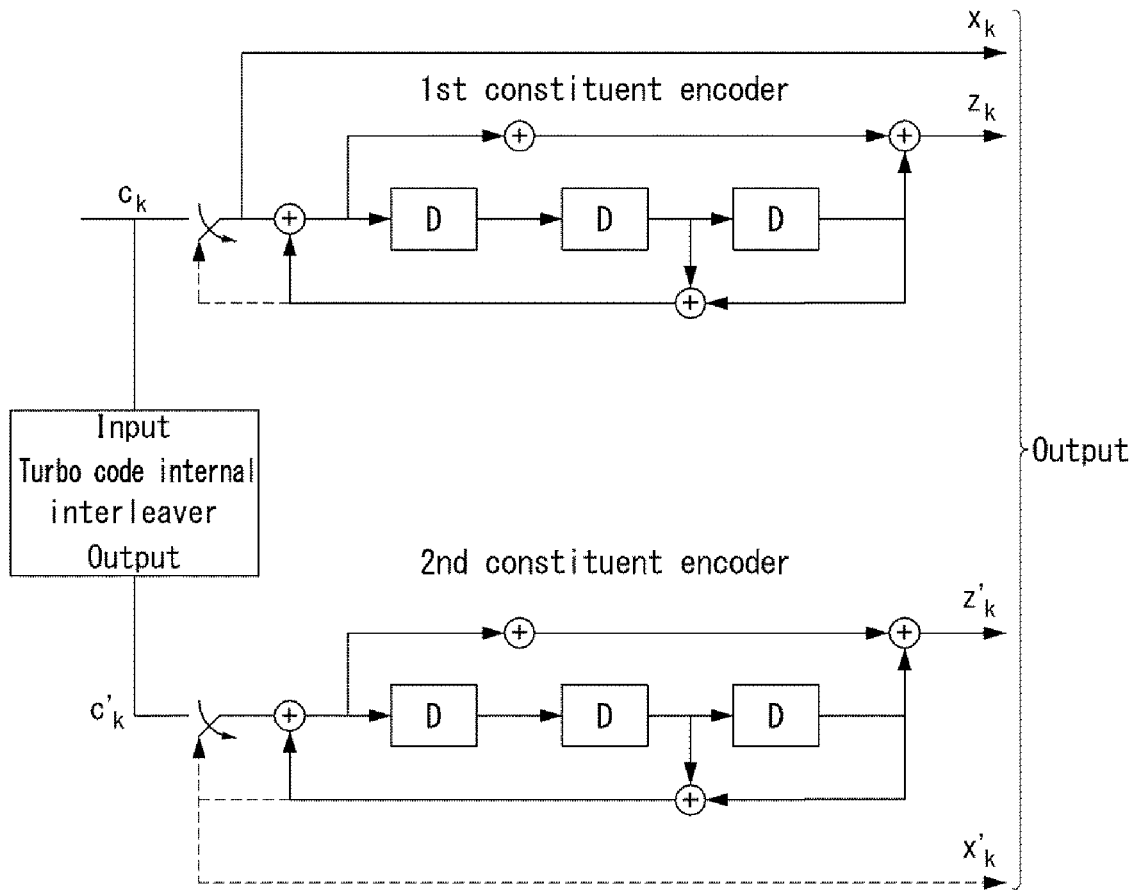
【Figure 32】
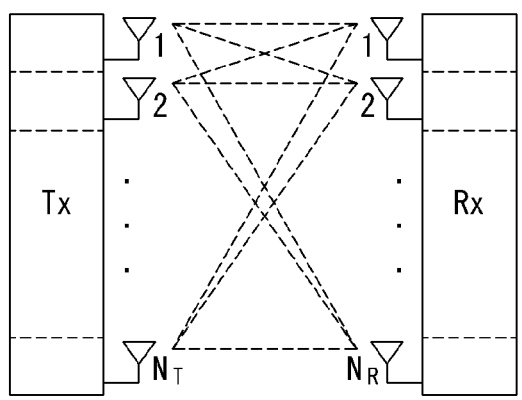

【Figure 33】
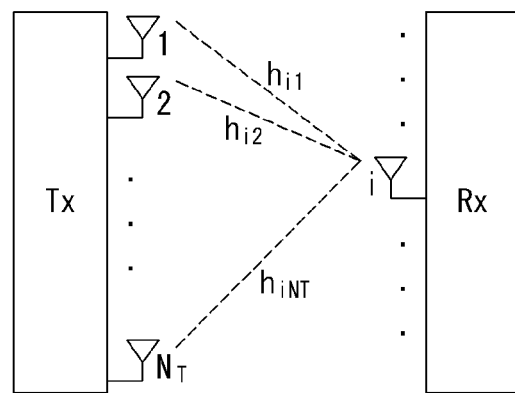

[Figure 34]
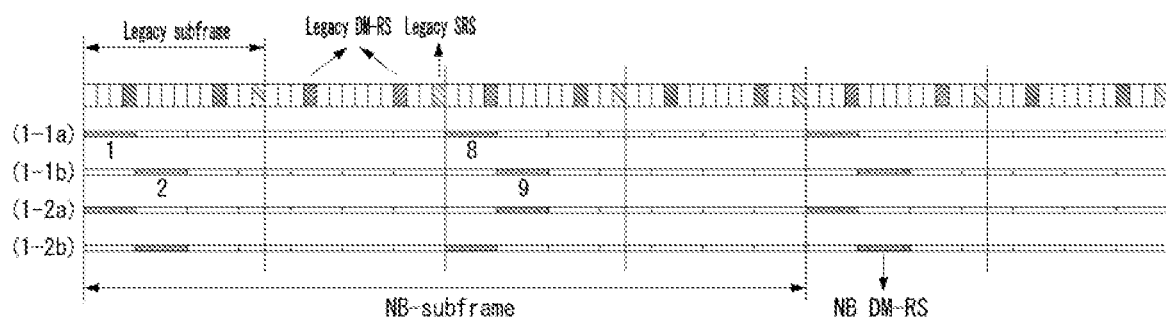

[Figure 35]
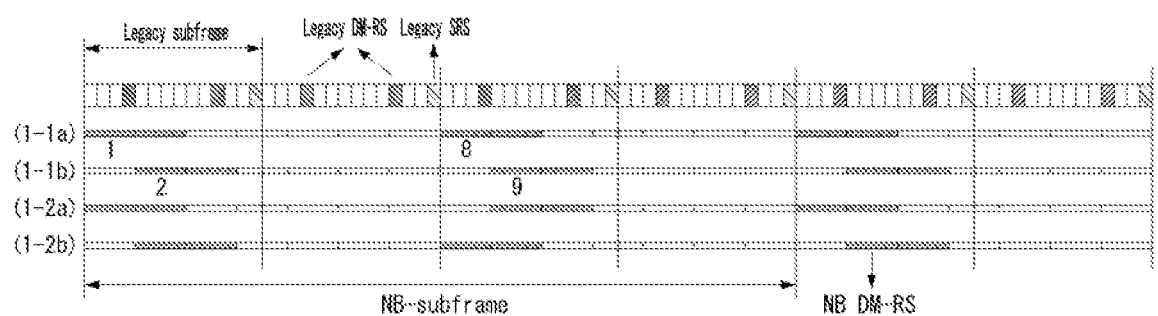

[Figure 36]
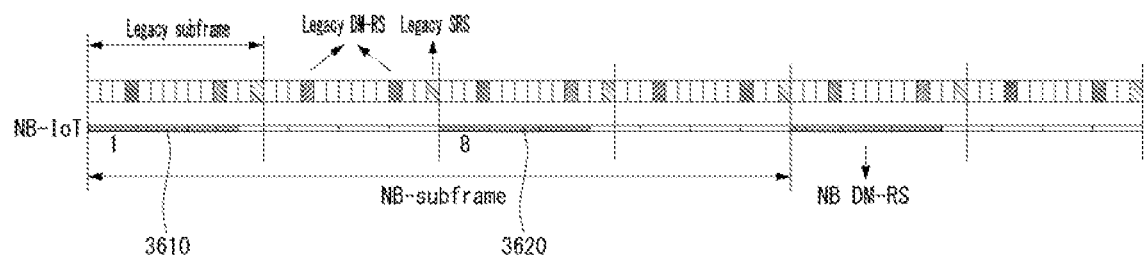

[Figure 37]
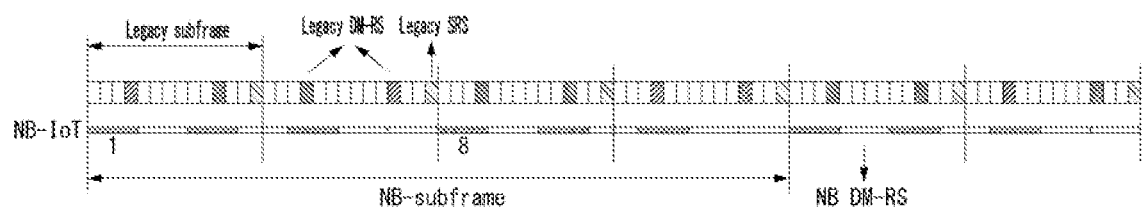

[Figure 38]
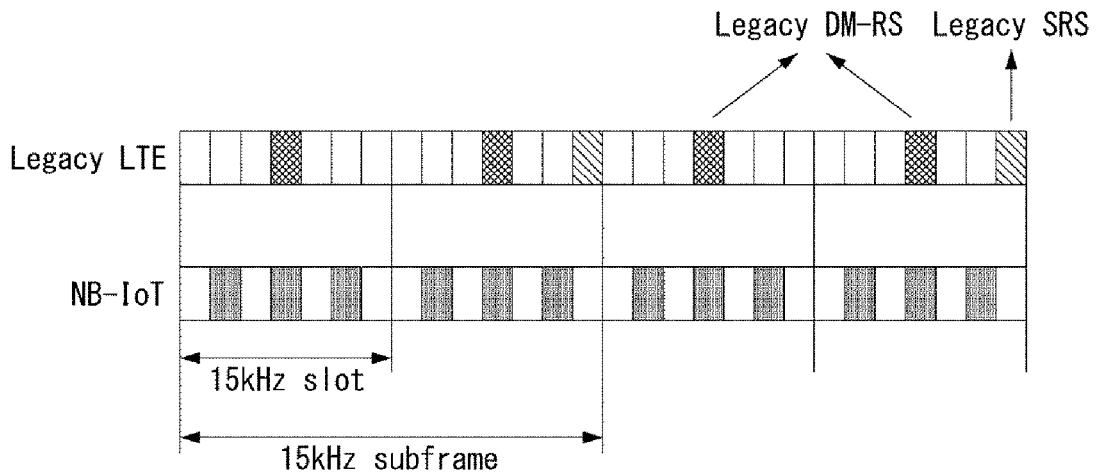
[Figure 39]
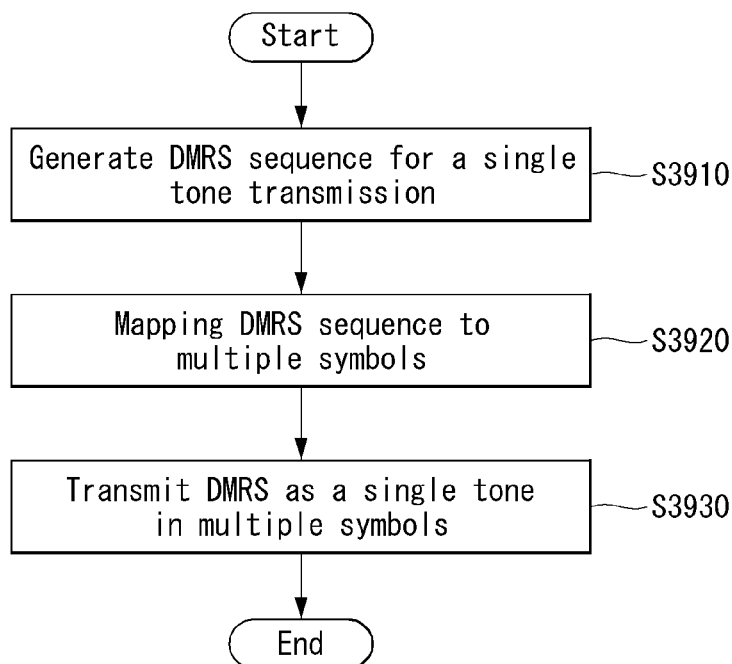

【Figure 40】
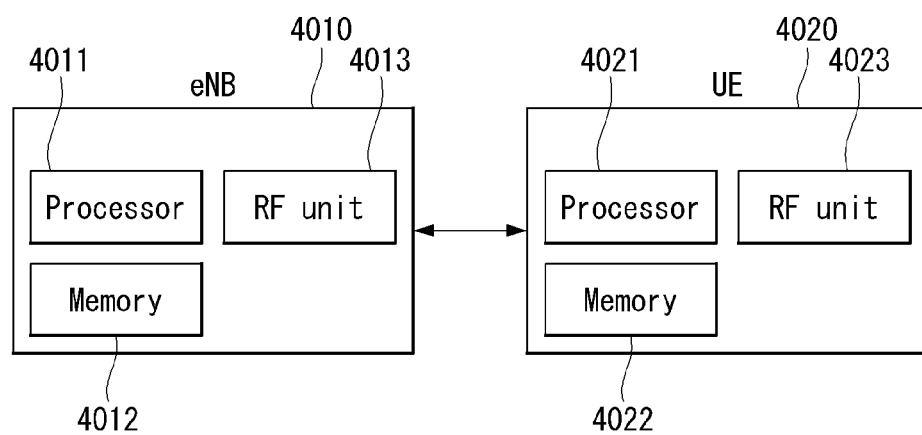

METHOD FOR TRANSMITTING DMRS IN WIRELESS COMMUNICATION SYSTEM SUPPORTING NB-IoT AND APPARATUS THEREFOR

CROSS-REFERENCE TO RELATED APPLICATIONS

This application is a continuation of U.S. patent application Ser. No. 17/081,330, filed on Oct. 27, 2020, which is a continuation of U.S. patent application Ser. No. 16/075,128, filed on Aug. 2, 2018, now U.S. Pat. No. 10,848,356, which is the National Stage filing under 35 U.S.C. 371 of International Application No. PCT/KR2017/001118, filed on Feb. 2, 2017, which claims the benefit of U.S. Provisional Application Nos. 62/289,914, filed on Feb. 2, 2016, 62/294,309, filed on Feb. 12, 2016, 62/295,457, filed on Feb. 15, 2016, 62/305,527, filed on Mar. 8, 2016, and 62/339,102, filed on May 20, 2016, the contents of which are all hereby incorporated by reference herein in their entirety.

TECHNICAL FIELD

The present invention relates to a wireless communication system supporting NarrowBand-Internet of Things (NB-IoT) and, more particularly, to a method for transmitting a demodulation reference signal (DMRS) in a wireless communication system supporting NB-IoT and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An object of this specification is to provide a method of defining an NB-PUSCH frame structure for supporting single tone transmission in an NB-IoT system.

Specifically, an object of this specification is to provide a method of determining the position of a DMRS symbol for supporting an NB-PUSCH.

Furthermore, an object of this specification is to provide a method of generating a DMRS sequence and applying a phase rotation to each of a DMRS symbol and/or data symbol so as to minimize a PAPR/CM.

Furthermore, an object of this specification is to provide a method of setting an initial phase value of a phase rotation.

Furthermore, an object of this specification is to provide a method of compensating for the timing offset of DMRS sequences for multiple terminals.

Technical objects to be achieved in this specification are not limited to the aforementioned objects, and those skilled in the art to which the present invention pertains may evidently understand other technological objects from the following description.

Technical Solution

This specification provides a method of transmitting a demodulation reference signal (DMRS) in a wireless communication system supporting Narrowband (NB)-Internet of Things (IoT). The method performed by a terminal includes generating a reference signal sequence used for demodulation with respect to single tone transmission, mapping a reference signal sequence to multiple symbols, and transmitting the DMRS to a base station in the multiple symbols using a single tone. If a narrow band (NB) physical uplink channel is transmitted as the single tone, BPSK or QPSK is applied as a modulation scheme for the NB physical uplink channel. A phase rotation is applied to each of the multiple symbols. The applied phase rotation is determined based on a modulation scheme applied to the NB physical uplink channel. The multiple symbols correspond to the first symbol, second symbol and third symbol of a slot, respectively.

Furthermore, in this specification, the applied phase rotation is determined based on a first parameter determined according to the modulation scheme.

Furthermore, in this specification, the first parameter is $\pi/2$ or $\pi/4$.

Furthermore, in this specification, the applied phase rotation is determined based on the first parameter and a result value of modulo operation of 2 for a symbol index indicative of a symbol within a specific time unit.

Furthermore, in this specification, the phase rotation is applied to each of symbols to which the NB physical uplink channel is mapped.

Furthermore, in this specification, the DMRS sequence is generated using a pseudo-random sequence.

Furthermore, this specification further includes applying orthogonal cover code (OCC) to the multiple symbols.

Furthermore, in this specification, the initial phase value of the phase rotation is applied at the start of each specific unit.

Furthermore, in this specification, the specific unit is a slot, subframe or radio frame.

Furthermore, in this specification, the initial phase value is set using at least one of a cell ID and the specific unit.

Furthermore, in this specification, the narrow band (NB) has a bandwidth of 180 kHz.

Furthermore, in this specification, the transmission of the DMRS is performed in an inband mode of the NB-IoT system.

Furthermore, this specification provides a terminal for transmitting a demodulation reference signal (DMRS) in a wireless communication system supporting Narrowband (NB)-Internet of Things (IoT). The terminal includes a radio frequency (RF) unit for transmitting and receiving radio signals and a processor functionally coupled to the RF unit. The processor generates a reference signal sequence used for demodulation with respect to single tone transmission, maps a reference signal sequence to multiple symbols, and controls to transmit the DMRS to a base station in the multiple symbols using a single tone. If a narrow band (NB) physical uplink channel is transmitted as the single tone, BPSK or QPSK is applied as a modulation scheme for the NB physical uplink channel. A phase rotation is applied to each of the multiple symbols. The applied phase rotation is determined based on a modulation scheme applied to the NB physical uplink channel. The multiple symbols correspond to the first symbol, second symbol and third symbol of a slot, respectively.

Advantageous Effects

This specification has an effect in that it can avoid a collision between a DMRS of NB-IoT and SRS transmission legacy of LTE by determining the position of a DMRS symbol for supporting an NB-PUSCH with consideration taken of the position of an SRS symbol of legacy LTE.

Furthermore, this specification has an effect in that it can minimize a PAPR/CM that may occur in single tone transmission by generating a DMRS sequence and applying a phase rotation to each of a DMRS symbol and/or a data symbol.

Furthermore, this specification has an effect in that it can reduce inter-cell interference by newly defining the initial phase value of a phase rotation.

Furthermore, this specification has an effect in that it can reduce inter-cell interference by compensating for the timing offset of DMRS sequences for multiple terminals.

Effects which may be obtained by this specification are not limited to the aforementioned effects, and various other effects may be evidently understood by those skilled in the art to which the present invention pertains from the following description.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates the structure of a wireless frame in a wireless communication system to which the present invention is applicable.

FIG. 2 illustrates a resource grid for one DL slot in a wireless communication system to which the present invention is applicable.

FIG. 3 illustrates the structure of a DL subframe in a wireless communication system to which the present invention is applicable.

FIG. 4 illustrates the structure of an UL subframe in a wireless communication system to which the present invention is applicable.

FIG. 5 illustrates an example of a form in which PUCCH formats are mapped to a PUCCH area of an UL physical resource block in a wireless communication system to which the present invention is applicable.

FIG. 6 illustrates the structure of a CQI channel in the case of a general CP in a wireless communication system to which the present invention is applicable.

FIG. 7 illustrates the structure of ACK/NACK channel in the case of a general CP in a wireless communication system to which the present invention is applicable.

FIG. 8 illustrates an example of generating 5 SC-FDMA symbols during one slot and generating the generated 5 SC-FDMA symbols in a wireless communication system to which the present invention is applicable.

FIG. 9 illustrates an example of a component carrier and a carrier aggregation in a wireless communication system to which the present invention is applicable.

FIG. 10 illustrates an example of a subframe structure according to a cross carrier scheduling in a wireless communication system to which the present invention is applicable.

FIG. 11 illustrates an example of a transmission channel processing of an UL-SCH in a wireless communication system to which the present invention is applicable.

FIG. 12 illustrates an example of a signal processing process of an UL shared channel which is a transport channel in a wireless communication system to which the present application is applicable.

FIG. 13 illustrates a reference signal pattern which is mapped on a DL resource block pair in a wireless communication system to which the present invention is applicable.

FIG. 14 illustrates an UL subframe including a sounding reference signal symbol in a wireless communication system to which the present invention is applicable.

FIG. 15 illustrates an example of a multiplexing of legacy PDCCH, PDSCH and EPDCCH.

FIG. 16 illustrates a section of a cell division of a system supporting a carrier aggregation.

FIG. 17 illustrates the structure of a frame used for SS transmission in a system which uses a basic CP (Cyclic Prefix).

FIG. 18 illustrates a frame structure used for SS transmission in a system which uses an extended CP.

FIG. 19 illustrates two sequences in a logical region being interleaved and mapped in a physical region.

FIG. 20 illustrates a frame structure in which M-PSS and M-SSS are mapped.

FIG. 21 illustrates a method of generating M-PSS according to an embodiment of the present invention.

FIG. 22 illustrates a method of generating M-SSS according to an embodiment of the present invention.

FIG. 23 illustrates an example of a method of implementing M-PSS to which a method proposed in the present specification is applicable.

FIG. 24 illustrates how UL numerology is stretched in a time domain.

FIG. 25 illustrates an example of time units for the UL of NB-LTE based on 2.5 kHz subcarrier spacing.

FIG. 26 illustrates an example of an operation system of NB LTE system to which the method proposed in the present specification is applicable.

FIG. 27 illustrates an example of an NB-frame structure of 15 kHz subcarrier spacing to which the method proposed in the present specification is applicable.

FIG. 28 illustrates an example of NB-frame structure for 3.75 kHz subcarrier spacing to which the method proposed in the present specification is applicable.

FIG. 29 illustrates an example of NB subframe structure in 3.75 kHz subcarrier spacing to which the method proposed in the present specification is applicable.

FIG. 30 illustrates an example of PUSCH processing in NB-IoT system to which the method proposed in the present specification is applicable.

FIG. 31 illustrates an example of an LTE turbo encoder used for PUSCH in NB-IoT system to which the method proposed in the present specification is applicable.

FIG. 32 shows the configuration of a common multi-input and multi-output antenna (MIMO) communication system.

FIG. 33 is a diagram showing channels from multiple Tx antennas to one Rx antenna.

FIG. 34 shows an example of a DM-RS symbol mapping method in NB-IoT proposed in this specification.

FIG. 35 shows another example of a DM-RS symbol mapping method in NB-IoT proposed in this specification.

FIG. 36 shows another example of a DM-RS symbol mapping method in NB-IoT proposed in this specification.

FIG. 37 shows another example of a DM-RS symbol mapping method in NB-IoT proposed in this specification.

FIG. 38 shows another example of a DM-RS symbol mapping method in NB-IoT proposed in this specification.

FIG. 39 is a flowchart illustrating an example of a method of transmitting and receiving DM-RSs in NB-IoT proposed in this specification.

FIG. 40 shows an example of the internal block diagram of a wireless communication apparatus to which the methods proposed in this specification may be applied.

MODE FOR INVENTION

Hereafter, preferred embodiments of the present invention will be described in detail with reference to the accompanying drawings. A detailed description to be disclosed hereinafter together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. In general, a base station (BS) may be substituted with a term, such as a fixed station, Node B, evolved-NodeB (eNB), base transceiver system (BTS) or access point (AP). Further, a 'terminal' may be fixed or movable and be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device or a device-to-device (D2D) device.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is basically described for clear description, but the technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows he uplink-downlink configuration.

TABLE 11

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms and 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of former three OFDM symbols in the first slot of the sub frame are a control region to which control channels are allocated and the remaining OFDM symbols are a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (i.e., the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to a PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (i.e., SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 2 given below.

TABLE 2

| PUCCH Format | Uplink Control Information (UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and 0, 1, ..., $N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both the PUCCH format 2/2a/2b and the PUCCH format 1/1a/1b may be mixed and mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})} n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, ..., N−1) having a length of N becomes y(0), y(1), y(2), ..., y(N−1). y(0), ..., y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention can be applied.

In FIG. 8, an example of generating and transmitting 5 SC-FDMA symbols (i.e., data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be interchangeably used with a term, such as a carrier aggregation, a bandwidth aggregation or a spectrum aggregation.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (i.e., LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell). The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfiguration) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfiguration) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 9 illustrates examples of a component carrier and carrier aggregation in the wireless communication system to which the present invention can be applied.

FIG. 9a illustrates a single carrier structure used in an LTE system. The component carrier includes the DL CC and the UL CC. One component carrier may have a frequency range of 20 MHz.

FIG. 9b illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

FIG. 10 illustrates one example of a subframe structure depending on cross carrier scheduling in the wireless communication system to which the present invention can be applied.

Referring to FIG. 10, a case is illustrated, in which three DL CCs are associated with a DL subframe for an LTE-A terminal and DL CC'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

General ACK/NACK Multiplexing Method

In a situation in which the terminal simultaneously needs to transmit multiple ACKs/NACKs corresponding to multiple data units received from an eNB, an ACK/NACK multiplexing method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 3 given below.

TABLE 3

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 3, HARQ-ACK(i) represents an ACK/NACK result for an i-th data unit. In Table 3, discontinuous transmission (DTX) means that there is no data unit to be transmitted for the corresponding HARQ-ACK(i) or that the terminal may not detect the data unit corresponding to the HARQ-ACK(i).

According to Table 3, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,0}^{(1)}$.

When the terminal fails to decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Validation of PDCCH for Semi-persistent Scheduling

Semi-persistent scheduling (SPS) is a scheduling scheme that allocates the resource to the terminal to be persistently maintained during a specific time interval.

When a predetermined amount of data is transmitted for a specific time like a voice over Internet protocol (VoIP), since the control information need not be transmitted every data transmission interval for the resource allocation, the waste of the control information may be reduced by using the SPS scheme. In a so-called semi-persistent scheduling (SPS) method, a time resource domain in which the resource may be allocated to the terminal is preferentially allocated.

In this case, in a semi-persistent allocation method, a time resource domain allocated to a specific terminal may be configured to have periodicity. Then, a frequency resource domain is allocated as necessary to complete allocation of the time-frequency resource. Allocating the frequency resource domain may be designated as so-called activation.

When the semi-persistent allocation method is used, since the resource allocation is maintained during a predetermined period by one-time signaling, the resource need not be repeatedly allocated, and as a result, signaling overhead may be reduced.

Thereafter, since the resource allocation to the terminal is not required, signaling for releasing the frequency resource allocation may be transmitted from the base station to the terminal. Releasing the allocation of the frequency resource domain may be designated as deactivation.

In current LTE, in which subframes the SPS is first transmitted/received through radio resource control (RRC) signaling for the SPS for the uplink and/or downlink is announced to the terminal. That is, the time resource is preferentially designated among the time and frequency resources allocated for the SPS through the RRC signaling. In order to announce a usable subframe, for example, a period and an offset of the subframe may be announced. However, since the terminal is allocated with only the time resource domain through the RRC signaling, even though the terminal receives the RRC signaling, the terminal does not immediately perform transmission and reception by the SPS and the terminal allocates the frequency resource domain as necessary to complete the allocation of the time-frequency resource. Allocating the frequency resource domain may be designated as deactivation and releasing the allocation of the frequency resource domain may be designated as deactivation.

Therefore, the terminal receives the PDCCH indicating the activation and thereafter, allocate the frequency resource according to RB allocation information included in the received PDCCH and applies modulation and code rate depending on modulation and coding scheme (MCS) information to start transmission and reception according to the period and the offset of the subframe allocated through the RRC signaling.

Next, when the terminal receives the PDCCH announcing the deactivation from the base station, the terminal stops transmission and reception. When the terminal receives the PDCCH indicating the activation or reactivation after stopping the transmission and reception, the terminal resumes the transmission and reception again with the period and the offset of the subframe allocated through the RRC signaling by using the RC allocation, the MCS, and the like designated by the PDCCH. That is, the time resource is performed through the RRC signaling, but the signal may be actually transmitted and received after receiving the PDCCH indicating the activation and reactivation of the SPS and the signal transmission and reception stop after receiving the PDCCH indicating the deactivation of the SPS.

When all conditions described below are satisfied, the terminal may validate a PDCCH including an SPS indication. First, a CRC parity bit added for a PDCCH payload needs to be scrambled with an SPS C-RNTI and second, a new data indicator (NDI) field needs to be set to 0. Herein, in the case of DCI formats 2, 2A, 2B, and 2C, the new data indicator field indicates one activated transmission block.

In addition, when each field used in the DCI format is set according to Tables 4 and 5 given below, the validation is completed. When the validation is completed, the terminal recognizes that received DCI information is valid SPS activation or deactivation (alternatively, release). On the contrary, when the validation is not completed, the terminal recognizes that a non-matching CRC is included in the received DCI format.

Table 4 shows a field for validating the PDCCH indicating the SPS activation.

TABLE 4

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 shows a field for validating the PDCCH indicating the SPS deactivation (alternatively, release).

TABLE 5

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

When the DCI format indicates SPS downlink scheduling activation, a TPC command value for the PUCCH field may be used as indexes indicating four PUCCH resource values set by the upper layer.

PUCCH Piggybacking in Rel-8 LTE

FIG. 11 illustrates one example of transport channel processing of a UL-SCH in the wireless communication system to which the present invention can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

FIG. 12 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 12, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block received from the upper layer (S120). In this case, A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S121). Bits after the code block segmentation and the CRC attachment are shown in $c_{r0}, c_{r1}, c_{r2}, c_{r3}, \ldots, c_{r(K_r-1)}$. Herein, r represents No. (r=0, \ldots, C−1) of the code block and Kr represents the bit number depending on the code block r. Further, C represents the total number of code blocks.

Subsequently, channel coding is performed (S122). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i indicates an encoded stream index and may have a value of 0, 1, or 2. Dr represents the number of bits of the i-th encoded stream for the code block r. r represents the code block number (r=0, \ldots, C−1) and C represents the total number of code blocks. Each code block may be encoded by turbo coding.

Subsequently, rate matching is performed (S123). Bits after the rate matching are shown in $e_{r0}, e_{r1}, e_{r2}, e_{r3}, \ldots, e_{r(E_r-1)}$. In this case, r represents the code block number (r=0, \ldots, C−1) and C represents the total number of code blocks. Er indicates the number of rate-matched bits of the r-th code block.

Subsequently, concatenation among the code blocks is performed again (S124). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S126, S127, and S128). Since different encoded symbols are allocated for transmitting each piece of control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S134, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S125). A multiplexed result of the data and the CQI/PMI is shown in $\underline{g}_0, \underline{g}_1, \underline{g}_2, \underline{g}_3, \ldots, \underline{g}_{H'-1}$. In this case, $\underline{g}_i$ (i=0, ..., H'-1) represents a column vector having a length of $(Q_m \cdot N_L)$. $H=(G+N_L \cdot Q_{CQI})$ and $H'=H/(N_L \cdot Q_m)$. $N_L$ indicates the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S129).

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

When the data is transmitted and received by using the MIMO antenna, a channel state between the transmitting antenna and the receiving antenna need to be detected in order to accurately receive the signal. Therefore, the respective transmitting antennas need to have individual reference signals.

The downlink reference signal includes a common RS (CRS) shared by all terminals in one cell and a dedicated RS (DRS) for a specific terminal. Information for demodulation and channel measurement may be provided by using the reference signals.

The receiver side (i.e., terminal) measures the channel state from the CRS and feeds back the indicators associated with the channel quality, such as the channel quality indicator (CQI), the precoding matrix index (PMI), and/or the rank indicator (RI) to the transmitting side (i.e., base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as a UE-specific RS or demodulation RS (DMRS).

FIG. 13 illustrates a reference signal pattern mapped to a downlink resource block pair in the wireless communication system to which the present invention can be applied.

Referring to FIG. 13, as a wise in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (FIG. 13a) and a length of 12 OFDM symbols in the case of an extended cyclic prefix (CP) (FIG. 13b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. Further, the CRS may be used to demodulate the channel quality information (CSI) and data.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \qquad \text{[Equation 1]}$$

$$l = \begin{cases} 0, N_{symb}^{DL} - 3 & \text{if } p \in \{0,1\} \\ 1 & \text{if } p \in \{2,3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3 k-th subcarrier and a reference signal in another cell is allocated to a 3 k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 2 shows the case of the normal CP and Equation 3 shows the case of the extended CP.

$$k = (k') \bmod N_{sc}^{RB} + N_{sc}^{RB} \cdot n_{PRB} \qquad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ subordinated to the cell ID, the position of the reference signal has various frequency shift values according to the cell.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

FIG. 14 illustrates an uplink subframe including a sounding reference signal symbol in the wireless communication system to which the present invention can be applied.

Referring to FIG. 14, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished by allocating different base sequences to respective cells, but orthogonality among different base sequences is not assured.

Coordinated Multi-point Transmission and Reception (COMP)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Cross-CC Scheduling and E-PDCCH Scheduling

In the existing 3GPP LTE Rel-10 system, if a cross-CC scheduling operation is defined in an aggregation situation for a plurality of CCs (component carrier=(serving) cell), one CC may be preset to be able to receive DL/UL scheduling from only one specific CC (i.e., scheduling CC) (namely, to be able to receive DL/UL grant PDCCH for the corresponding scheduled CC).

The corresponding scheduling CC may basically perform a DL/UL scheduling for the scheduling CC itself In other words, the SS for the PDCCH scheduling the scheduling/scheduled CC in the cross-CC scheduling relation may come to exist in the control channel area of the scheduling CC.

Meanwhile, in the LTE system, CFDD DL carrier or TDD DL subframes use first n OFDM symbols of the subframe for PDCCH, PHICH, PCFICH and the like which are physical channels for transmission of various pieces of control information and use the rest of the OFDM symbols for PDSCH transmission.

At this time, the number of symbols used for control channel transmission in each subframe is dynamically transmitted to the UE through the physical channel such as PCFICH or is semi-statically transmitted to the UE through RRC signaling.

At this time, particularly, value n may be set by 1 to 4 symbols depending on the subframe characteristic and system characteristic (FDD/TDD, system bandwidth, etc.).

Meanwhile, in the existing LTE system, PDCCH, which is the physical channel for transmitting DL/UL scheduling and various control information, may be transmitted through limited OFDM symbols.

Hence, the enhanced PDCCH (i.e., E-PDCCH), which is more freely multiplexed in PDSCH and FDM/TDM scheme, may be introduced instead of the control channel which is transmitted through the OFDM which is separated from the PDSCH like PDCCH.

FIG. 15 illustrates an example of multiplexing legacy PDCCH, PDSCH and E-PDCCH.

Here, the legacy PDCCH may be expressed as L-PDCCH.

FIG. 16 is a diagram illustrating a cell classification in a system that supports the carrier aggregation.

Referring to FIG. 16, a configured cell is a cell that should be carrier-merged based on a measurement report among the cells of a BS may be configured for each terminal. The configured cell may reserve a resource for an ACK/NACK transmission for a PDSCH transmission beforehand. An activated cell is a cell that is configured to transmit PDSCH/PUSCH actually among the configured cells, and performs a Channel State Information (CSI) report for the PDSCH/PUSCH transmission and a Sounding Reference Signal (SRS) transmission. A de-activated cell is a cell that does not transmit the PDSCH/PUSCH transmission by a command of BS or a timer operation, may also stop the CSI report and the SRS transmission.

Synchronization Signal/Sequence (SS)

An SS includes a primary (P)-SS and a secondary (S)-SS, and corresponds to a signal used when a cell search is performed.

FIG. 17 is a diagram illustrating a frame structure used for an SS transmission in a system that uses a normal cyclic prefix (CP). FIG. 10 is a diagram illustrating a frame structure used for an SS transmission in a system that uses an extended CP.

The SS is transmitted in 0th subframe and second slot of the fifth subframe, respectively, considering 4.6 ms which is a Global System for Mobile communications (GSM) frame length for the easiness of an inter-Radio Access Technology (RAT) measurement, and a boundary for the corresponding radio frame may be detected through the S-SS. The P-SS is transmitted in the last OFDM symbol of the corresponding slot and the S-SS is transmitted in the previous OFDM symbol of the P-SS.

The SS may transmit total 504 physical cell IDs through the combination of 3 P-SSs and 168 S-SSs. In addition, the SS and the PBCH are transmitted within 6 RBs at the center of a system bandwidth such that a terminal may detect or decode them regardless of the transmission bandwidth.

A transmission diversity scheme of the SS is to use a single antenna port only and not separately used in a standard. That is, the transmission diversity scheme of the SS uses a single antenna transmission or a transmission technique transparent to a terminal (e.g., Precoder Vector Switching (PVS), Time-Switched Transmit Diversity (TSTD) and Cyclic-Delay Diversity (CDD)).

1. P-SS Sign

Zadoff-Chu (ZC) sequence of length 63 in frequency domain may be defined and used as a sequence of the P-SS. The ZC sequence is defined by Equation 4, a sequence element, n=31 that corresponds to a DC subcarrier is punctured. In Equation 4, N_zc=63.

$$d_u(n) = e^{-j\frac{\pi u n(n+1)}{N_{ZC}}}$$ [Equation 4]

Among 6 RBs (=7 subcarriers) positioned at the center of frequency domain, the remaining 9 subcarriers are always transmitted in zero value, which makes it easy to design a filter for performing synchronization. In order to define total three P-SSs, the value of u=29, 29 and 34 may be used in Equation 4. In this case, since 29 and 34 have the conjugate symmetry relation, two correlations may be simultaneously performed. Here, the conjugate symmetry means Equation 5. By using the characteristics, it is possible to implement one shot correlater for u=29 and 43, and accordingly, about 33.3% of total amount of calculation may be decreased.

[Equation 5]

$$d_u(n) = (-1)^n (d_{N_{ZC}-u}(n))^*, \text{ when } N_{ZC} \text{ is even number.}$$

$$d_u(n) = (d_{N_{ZC}-u}(n))^*, \text{ when } N_{ZC} \text{ is odd number.}$$

2. S-SS Sign

The sequence used for the S-SS is combined with two interleaved m-sequences of length 31, and 168 cell group IDs are transmitted by combining two sequences. The m-sequence as the SSS sequence is robust in the frequency selective environment, and may be transformed to the high-speed m-sequence using the Fast Hadamard Transform, thereby the amount of operations being decreased. In addition, the configuration of SSS using two short codes is proposed to decrease the amount of operations of terminal.

FIG. 19 is a diagram illustrating two sequences in a logical region being mapped to a physical region by being interleaved.

Referring to FIG. 19, when two m-sequences used for generating the S-SS sign are defined by S1 and S2, in the case that the S-SS (S1, S2) of subframe 0 transmits the cell group ID with the combination, the S-SS (S2, S1) of subframe 5 is transmitted with being swapped, thereby distinguishing the 10 ms frame boundary. In this case, the SSS sign uses the generation polynomial x5+x2+1, and total 31 signs may be generated through the circular shift.

In order to improve the reception performance, two different P-SS-based sequences are defined and scrambled to the S-SS, and scrambled to S1 and S2 with different sequences. Later, by defining the S1-based scrambling sign, the scrambling is performed to S2. In this case, the sign of S-SS is exchanged in a unit of 5 ms, but the P-SS-based scrambling sign is not exchanged. The P-SS-based scrambling sign is defined by six circular shift versions according to the P-SS index in the m-sequence generated from the generation polynomial x5+x2+1, and the S1-based scrambling sign is defined by eight circular shift versions according to the S1 index in the m-sequence generated from the generation polynomial x5+x4+x2+x1+1.

The contents below exemplify an asynchronous standard of the LTE system.

A terminal may monitor a downlink link quality based on a cell-specific reference signal in order to detect a downlink radio link quality of PCell.

A terminal may estimate a downlink radio link quality for the purpose of monitoring the downlink radio link quality of PCell, and may compare it with Q_out and Q_in, which are thresholds.

The threshold value Q_out may be defined as a level in which a downlink radio link is not certainly received, and may correspond to a block error rate 10% of a hypothetical PDCCH transmission considering a PCFICH together with transmission parameters.

The threshold value Q_in may be defined as a downlink radio link quality level, which may be great and more certainly received than Q_out, and may correspond to a block error rate 2% of a hypothetical PDCCH transmission considering a PCFICH together with transmission parameters.

Narrow Band (NB) LTE Cell Search

In the NB-LTE, although a cell search may follow the same rule as the LTE, there may be an appropriate modification in the sequence design in order to increase the cell search capability.

FIG. 20 is a diagram illustrating a frame structure to which M-PSS and M-SSS are mapped. In the present disclosure, an M-PSS designates the P-SS in the NB-LTE, and an M-SSS designates the S-SS in the NB-LTE. The M-PSS may also be designated to 'NB-PSS' and the M-SSS may also be designated to 'NB-SSS'.

Referring to FIG. 20, in the case of the M-PSS, a single primary synchronization sequence/signal may be used. (M-)PSS may be spanned up to 9 OFDM symbol lengths, and used for determining subframe timing as well as an accurate frequency offset.

This may be interpreted that a terminal may use the M-PSS for acquiring time and frequency synchronization with a BS. In this case, (M-)PSS may be consecutively located in time domain.

The M-SSS may be spanned up to 6 OFDM symbol lengths, and used for determining the timing of a cell identifier and an M-frame. This may be interpreted that a terminal may use the M-SSS for detecting an identifier of a BS. In order to support the same number as the number of cell identifier groups of the LTE, 504 different (M-)SSS may be designed.

Referring to the design of FIG. 20, the M-PSS and the M-SSS are repeated every 20 ms average, and existed/generated four times in a block of 80 ms. In the subframes that include synchronization sequences, the M-PSS occupies the last 9 OFDM symbols. The M-SSS occupies 6th, 7th, 10th, 11th, 13th and 14th OFDM symbols in the case of normal CP, and occupies 5th, 6th, 9th, 11th and 12th OFDM symbols in the case of extended CP.

The 9 OFDM symbols occupied by the M-PSS may be selected to support for the in-band disposition between LTE carriers. This is because the first three OFDM symbols are used to carry a PDCCH in the hosting LTE system and a subframe includes minimum twelve OFDM symbols (in the case of extended CP).

In the hosting LTE system, a cell-specific reference signal (CRS) is transmitted, and the resource elements that correspond to the M-PSS may be punctured in order to avoid a collision. In the NB-LTE, a specific position of M-PSS/M-SSS may be determined to avoid a collision with many legacy LTE signals such as the PDCCH, the PCFICH, the PHICH and/or the MBSFN.

In comparison with the LTE, the synchronization sequence design in the NB-LTE may be different.

This may be performed in order to attain a compromise between decreased memory consumption and faster synchronization in a terminal. Since the M-SSS is repeated four times in 80 ms duration, a slight design modification for the M-SSS may be required in the 80 ms duration in order to solve a timing uncertainty.

Structure of M-PSS and M-SSS

In the LTE, the PSS structure allows the low complexity design of timing and frequency offset measuring instrument, and the SSS is designed to acquire frame timing and to support unique 504 cell identifiers.

In the case of In-band and Guard-band of the LTE, the disposition of CP in the NB-LTE may be selected to match the CP in a hosting system. In the case of standalone, the extended CP may be used for matching a transmitter pulse shape for exerting the minimum damage to the hosting system (e.g., GSM).

A single M-PSS may be clearly stated in the N-LTE of the LTE. In the procedure of PSS synchronization of the LTE, for each of PSSs, a specific number of frequency speculations may be used for the coarse estimation of symbol timing and frequency offset.

Such an adaption of the procedure in the NB-LTE may increase the process complexity of a receiver according to the use of a plurality of frequency assumptions. In order to solve the problem, a sequence resembling of the Zadoff-Chu sequence which is differentially decoded in time domain may be proposed for the M-PSS. Since the differential decoding is performed in a transmission process, the differential decoding may be performed during the processing time of a receiver. Consequently, a frequency offset may be transformed from the consecutive rotation for symbols to the fixed phase offset with respect to the corresponding symbols.

FIG. 21 is a diagram illustrating a method for generating M-PSS according to an embodiment of the present invention.

Referring to FIG. 21, first, when starting with a basic sequence of length 107 as a basis in order to generate an M-PSS, Equation 6 below may be obtained.

$$c(n) = e^{-\frac{j\pi u n(n+1)}{N}}, n = \{0, 1, 2, \ldots, 106\} \qquad \text{[Equation 6]}$$

The basic sequence c(n) may be differentially decoded in order to obtain d(n) sequence as represented in Equation 7.

[Equation 7]

$$d(n+1) = d(n)c(n), n = \{0,1,2, \ldots, 106\}, d(0) = 1,$$

The d(n) sequence is divided into 9 sub sequences, and each sub sequence has a length 12 and a sampling rate of 130 kHz. The 120-point FFT is performed for each of 9 sub sequences, and each sequence may be oversampled 128/12 times up to 1.92 MHz sampling rate using 128 IFFT zero padding. Consequently, each sub sequence may be mapped to 12 subcarriers for 9 OFDM symbols, respectively.

Each of the sub sequences is mapped to a single OFDM symbol, and the M-PSS may occupy total 9 OFDM symbols since total 9 sub sequences are existed. Total length of the M-PSS may be 1234(=(128+9)*9+1) when the normal CP of 9 samples are used, and may be 1440 when the extended CP is used.

The M-PSS which is going to be actually used during the transmission is not required to be generated every time using complex procedure in a transmitter/receiver in the same manner. The complexity coefficient (i.e., t_u(n)) that corresponds to the M-PSS may be generated in offline, and directly stored in the transmitter/receiver. In addition, even in the case that the M-PSS is generated in 1.92 MHz, the occupation bandwidth may be 180 kHz.

Accordingly, in the case of performing the procedure related to time and frequency offset measurements using the M-PSS in a receiver, the sampling rate of 192 kHz may be used for all cases. This may significantly decrease the complexity of receiver in the cell search.

In comparison with the LTE, the frequency in which the M-PSS is generated in the NB-LTE causes slightly greater overhead than the PSS in the LTE. More particularly, the synchronization sequence used in the LTE occupies 2.86% of the entire transmission resources, and the synchronization sequence used in the NB-LTE occupies about 5.36% of the entire transmission resources. Such an additional overhead has an effect of decreasing memory consumption as well as the synchronization time that leads to the improved battery life and the lower device price.

The M-SSS is designed in frequency domain and occupies 12 subcarriers in each of 6 OFDM symbols. Accordingly, the number of resource elements dedicated to the M-SSS may be 72. The M-SSS includes the ZC sequence of a single length 61 which are padded by eleven '0's on the starting point.

In the case of the extended CP, the first 12 symbols of the M-SSS may be discarded, and the remaining symbols may be mapped to the valid OFDM symbols, which cause to discard only a single symbol among the sequence of length 61 since eleven '0's are existed on the starting point. The discard of the symbol causes the slight degradation of the correlation property of other SSS.

The cyclic shift of a sequence and the sequence for different roots may easily provide specific cell identifiers up to 504. The reason why the ZC sequence is used in the NB-LTE in comparison with the LTE is to decrease the error detection rate. Since a common sequence for two different cell identifier groups is existed, an additional procedure is required in the LTE.

Since the M-PSS/M-SSS occur four times within the block of 80 ms, the LTE design of the SSS cannot be used for providing accurate timing information within the corresponding block. This is because the special interleaving structure that may determine only two positions. Accordingly, a scrambling sequence may be used in an upper part of the ZC sequence in order to provide the information of frame timing. Four scrambling sequences may be required to determine four positions within the block of 80 ms, which may influence on acquiring the accurate timing.

FIG. 22 is a diagram illustrating a method for generating M-SSS according to an embodiment of the present invention.

Referring to FIG. 22, the M-SSS may be defined as s_p,q(n)=a_p(n).b_q(n). Herein, p={0, 1, . . . , 503} represents cell identifiers and q={0, 1, 2, 3} determines the position of the M-SSS (i.e., the number of M-SSS within the block of 80 ms which is generated before the latest SSS). In addition, a_p(n) and b_q(n) may be determined by Equations 8 and 9 below.

[Equation 8]
$$a_p(n) = 0, \quad n = \{0-4, 66-71\}$$
$$= a_p(n - k_p - 5), \quad n = \{5, 6, \ldots, 65\}$$
$$a_p(n) = e^{-\frac{j\pi m(p)n(n+1)}{61}}, \quad n = \{0, 1, \ldots, 61\}$$

[Equation 9]
$$b_q(n) = b(\mathrm{mod}(n - l_q, 63)) \quad n = \{0, 1, \ldots 60\},$$
$$q = \{0, 1, 2, 3\},$$
$$l_0 = 0, l_1 = 3, l_2 = 7, l_3 = 11$$
$$b(n + 6) = \mathrm{mod}(b(n) + b(n + 1), 2), \quad n = \{0, 1, \ldots 55\},$$
$$b(0) = 1, b(m) = 0, m = \{1, 2, 3, 4, 5\}$$

Referring to Equation 8, a_p(n) is the ZC sequence and determines a cell identifier group. m(p) and cyclic shift k_p may be used for providing a specific cell identifier. Referring to Equation 9, b_q(n) may be the scrambling sequence that includes a cyclic shift of the basic sequence b_(n), and may be used for indicating the position of the M-SSS in the M-frame in order to acquire the frame timing. The cyclic shift 1_q may be determined according to the value q.

The value of m(p) with respect to the specific p may be determined such as m(p)=1+mod(p, 61), the value of k_p may be determined such as k_p=7[p/61].

FIG. 23 illustrates an example of a method for implementing M-PSS to which the method proposed in the present disclosure can be applied.

Particularly, FIG. 23 shows a method for generating an M-PSS using a complementary Golay sequence.

As shown in FIG. 23, using a complementary Golay sequence pair, a CGS that is going to be transmitted to each OFDM symbol is selected (i.e., select a(n) or b(n)).

Next, in the case of using a cover code, c(1) to c(N) may be multiplied to each CGS, and in the case of not using the cover code, 1 may be inputted to all of c(n).

Subsequently, the DFT and the IFFT are performed for each symbol, and transmitted to each OFDM symbol on time domain.

Additionally, the ZC sequence of length 12 may also generate a sequence that is going to be transmitted to each OFDM symbol.

In this case, by using the same method applied in FIG. 23, the M-PSS may be implemented.

NB (Narrow Band)-LTE System

Hereinafter, NB-LTE (or NB-IoT) system will be described.

The UL of NB-LTE is based on SC-FDMA, and this is a special case of SC-FDMA and may flexibly allocate the bandwidth of the UE including single tone transmission.

One important aspect for the UL SC-FDMA is to enable time of a multiple of co-scheduled UEs coincide with each other so that the arrival time difference in the base station to be within the cyclic prefix (CP).

Ideally, the UL 15 kHz subcarrier spacing should be used in NB-LTE, but the time-accuracy, which may be achieved when detecting PRACH from the UEs in a very poor coverage condition, should be considered.

Hence, CP duration needs to be increased.

One way to achieve the above purpose is to reduce the subcarrier spacing for NB-LTE M-PUSCH to 2.5 kHz by dividing 15 kHz subcarrier spacing by 6.

Another motive for reducing subcarrier spacing is to allow a user multiplexing of a high level.

For example, one user is basically allocated to one subcarrier.

This is more effective for UEs in a condition that the coverage is very limited like UEs having no benefit from allocation of a high bandwidth while the capacity increases due to the simultaneous use of the maximum TX power of a multiple of UEs.

SC-FDMA is used for transmission of a multiple of tones in order to support a higher data rate along with the additional PAPR reduction technology.

The UL NB-LTE includes 3 basic channels including M-PRACH, M-PUCCH and M-PUSCH.

The design of M-PUCCH discuses at least three alterative plans as follows.

One tone in each edge of the system bandwidth
    UL control information transmission on M-PRACH or M-PUSCH
    Not having dedicated UL control channel Time-domain Frame and Structure In the UL of NB-LTE having 2.5 kHz subcarrier spacing, the wireless frame and the subframe are defined as 60 ms and 6 ms, respectively.

As in the DL of NB-LTE, M-frame and M-subframe are defined in the same manner in the UL link of the NB-LTE.

FIG. 24 illustrates how the UL numerology is stretched in the time domain.

The NB-LTE carrier includes 5 PRBs in the frequency domain. Each NB-LTE PRB includes 12 subcarriers.

The UL frame structure based on 2.5 kHz subcarrier spacing is illustrated in FIG. 17.

FIG. 24 illustrates an example of UL numerology which is stretched in the time domain when the subcarrier spacing is reduced from 15 kHz to 2.5 kHz.

FIG. 25 illustrates an example of time units for the UL of NB-LTE based on the 2.5 kHz subcarrier spacing.

Operation System of NB-LTE System

FIG. 26 illustrates an example of an operation system of NB-LTE system to which the method proposed in the present specification is applicable.

Specifically, FIG. 26(a) illustrates an in-band system, FIG. 26(b) illustrates a guard-band system, and FIG. 26(c) illustrates a stand-alone system.

The in-band system may be expressed as an in-band mode, the guard-band system may be expressed as a guard-band mode, and the stand-alone system may be expressed as a stand-alone mode.

The in-band system of FIG. 26(a) indicates a system or mode which uses a specific 1 RB within the legacy LTE band for NB-LTE (or LTE-NB) and may be operated by allocating some resource blocks of the LTE system carrier.

The guard-band system of FIG. 25(b) indicates a system or mode which uses NB-LTE in the space which is reserved for the guard band of the legacy LTE band and may be operated by allocating the guard-band of LTE carrier which is not used as the resource block in the LTE system.

The legacy LTE band includes the minimum 100 kHz at the last of each LTE band.

In order to use 200 kHz, 2 non-continuous guardbands may be used.

The in-band system and the guard-band system indicate the structure where NB-LTE co-exists within the legacy LTE band.

In contrast, the standalone system of FIG. 26(c) indicates a system or mode which is independently configured from the legacy LTE band and may be operated by separately allocating the frequency band (future reallocated GSM carrier) which is used in the GERAN.

FIG. 27 illustrates an example of an NB-frame structure of 15 kHz subcarrier spacing to which the method proposed in the present specification is applicable.

As illustrated in FIG. 27, it may be understood that the NB-frame structure for 15 kHz subcarrier spacing is the same as the frame structure of the legacy system (LTE system).

Namely, 10 ms NB-frame includes 10 1 ms NB-subframes, and 1 ms NB-subframe includes 2 0.5 ms NB-slots.

Further, 0.5 ms NB-slot includes 7 OFDM symbols.

FIG. 28 illustrates an example of NB-frame structure for 3.75 kHz subcarrier spacing to which the method proposed in the present specification is applicable.

Referring to FIG. 28, 10 ms NB-frame includes 5 2 ms NB-subframes, and 2 ms NB-subframe includes 7 OFDM symbols one guard-period (GP).

The 2 ms NB-subframe may also be expressed as NB-slot or NB-RU (resource unit), etc.

FIG. 29 illustrates an example of NB subframe structure in 3.75 kHz subcarrier spacing to which the method proposed in the present specification is applicable.

FIG. 29 shows the correspondence between legacy LTE subframe structure and 3.75 subframe structure.

Referring to FIG. 29, subframe (2 ms) of 3.75 kHz corresponds to 2 1 ms subframes (or 1 ms TTIs) of the legacy LTE.

UL Processing Chain

In the NB LTE system, the single tone transmission is used for M-PUSCH (or NPUSCH) in order to minimize PAPR, and as a result, the coverage is improved.

A specific procedure of the M-PUSCH processing is described with reference to FIG. 30.

FIG. 30 illustrates an example of PUSCH processing in NB-IoT system to which the method proposed in the present specification is applicable.

FIG. 31 illustrates an example of an LTE turbo encoder used for PUSCH in NB-IoT system to which the method proposed in the present specification is applicable.

CRC generation of M-PUSCH uses a polynomial which is the same as a polynomial for generating the CRC of M-PDSCH.

In the NB LTE system, the channel coding of the M-PUSCH is based on the LTE turbo code encoder as illustrated in FIG. 31.

The interleaving and the rate matching are the same as the method of M-PDSCH.

Encoded bits after the rate matching are scrambled with the scrambling mask which is generated according to the RNTI associated with the M-M-PUSCH transmission.

The scrambled codeword is modulated with BPSK or QPSK according to Table 6 below.

Table 6 shows an example of BPSK modulation mapping.

TABLE 6

| b(i) | I  | Q |
|------|----|---|
| 0    | 1  | 0 |
| 1    | −1 | 0 |

The modulated symbols are grouped in the subcarriers allocated to the M-PUSCH.

In the case of the single tone transmission, the transform precoding block of FIG. 19 is omitted and the group of MF tones is directed by the base station. The MF may be 1, 2, 4, or 8.

If only one tone is directed from the base station (i.e., MF=1), the one directed tone is used for M-PUSCH transmission.

Otherwise, if a multitude of tones are directed from the base station, each set of log2MF+log2MQ bits is determined through the tone transmitted between MF tones and the combination of modulation symbols.

Here, the MQ corresponds the modulation order, and the value is 2 in the BPSK and the value is 4 in the QPSK.

With respect to the SC-FDMA transmission having a multiple of continuous subcarriers within one cluster, the transform precoding block of FIG. 30 is applied to each group in order to obtain frequency-domain symbols (known as SC-FDMA).

In addition, in order to further lower PAPR for BPSK/QPSK, additionally potential PAPR reduction technologies may be applied.

An example of PAPR reduction technologies is to apply an additional precoding filter of M×L dimension (M>L) to the filer of the L×L DFT precoding.

Thereafter, the first baseband time-continuous signal is generated based on frequency-domain symbols as in equation 10 below.

$$s_l(t) = \sum_{k=-M/2}^{M/2-1} a_{k,l} \cdot e^{j2\pi(k+1/2)\Delta f(t - N_{CP,l}T_s)} \qquad \text{[Equation 10]}$$

With respect to $0 \leq t < (N_{CP,l}+N) \times t_s$ of Equation 10, M means the number of subcarriers allocated to M-PUSCH, N=128, Δf=2.5 kHz T, =1/320000, and $a_{k,l}$ means the frequency-domain symbol of the subcarrier corresponding to k+M/2.

Table 7 below shows values of $N_{CP,l}$ used.

In a special case that M=1, the first baseband time-continuous signal is generated based on frequency-domain symbols as Equation 10 below.

[Equation 11]

$$s_l(t) = a_{0,l} \cdot e^{-j\pi \Delta f(t - N_{CP,l} T_s)}$$

Table 7 shows an example of CUL CP length.

TABLE 7

| Configuration | Cyclic prefix length $N_{CP,l}$ |
|---|---|
| Normal cyclic prefix | 10 for l = 0<br>9 for l = 1, 2, . . . , 6 |

In the above Equations 10 and 11, Δf means a subcarrier spacing and $T_s$ means the sampling time.

Multi-Input Multi-Output (MIMO)

In general, the MIMO technology uses multiple transmit (Tx) antennas and multiple receive (Rx) antennas instead of one Tx antenna and one Rx antenna used so far. In other words, the MIMO technology is a technology for attempting a capacity increase or performance improvements using MIMO antennas in the transmission stage or reception stage of a wireless communication system. Hereinafter, "MIMO" is called "multi-input multi-output antennas."

More specifically, the multi-input multi-output technology does not depend on one antenna path so as to receive one total message, and completes total data by collecting a plurality of data pieces received through several antennas. As a result, the multi-input multi-output technology can increase the data transfer rate within a specific system range and can also increase a system range through a specific data transfer rate.

It is expected that next-generation mobile communication essentially requires an efficiency multi-input multi-output technology because it requires a much higher data transfer rate than the existing mobile communication. In such a condition, the MIMO communication technology is a next-generation mobile communication technology which may be widely used in mobile communication terminals, relays, etc. and attracts attention as a technology capable of overcoming a transmission amount limit to other mobile communication attributable to limited conditions due to data communication extension, etc.

Meanwhile, the multi-input multi-output (MIMO) antenna technology of various transmission efficiency improvement technologies that are being developed has come to the fore as a method capable of significantly improving the communication capacity and transmission and reception performance even without additional frequency allocation or power increase.

FIG. 32 shows the configuration of a common multi-input and multi-output antenna (MIMO) communication system.

Referring to FIG. 32, if the number of Tx antennas is increased to $N_T$ and the number of Rx antennas is increased to $N_R$ at the same time, a theoretical channel transmission capacity is increased in proportion to the number of antennas unlike in a case where multiple antennas are used in a transmitter or receiver. Accordingly, the transfer rate can be improved and frequency efficiency can be significantly enhanced. In this case, the transfer rate according to an increase of the channel transmission capacity may be theoretically increased by a value in which a maximum transfer rate $R_o$ when one antenna is used by the following rate increment $R_i$.

[Equation 12]

$$R_i = \min(N_T, N_R)$$

That is, for example, in a MIMO communication system using four Tx antennas and four Rx antennas, a four-times transfer rate can be obtained theoretically compared to a single antenna system.

The technology of such multi-input multi-output antennas may be divided into a spatial diversity method of increasing transmission reliability using symbols passing through various channel paths and a spatial multiplexing method of improving the transfer rate by transmitting multiple data symbols at the same time using multiple Tx antennas. Furthermore, a method of properly obtaining the advantages by properly combining the two methods is recently actively researched.

Each of the method is described below more specifically.

First, the spatial diversity method includes a time-space block code-series method and a time-space Trelis code-series method using a diversity gain and a coding gain at the same time. In general, the Trelis code method is excellent in bit error rate improvement performance and the degree of freedom of generation of code, but the time-space block code is simple in computational complexity. Such a space diversity gain may be obtained as an amount corresponding to the product (NT×NR) of the number of Tx antennas (NT) and the number of Rx antenna (NR).

Second, the spatial multiplexing scheme is a method of transmitting different data streams in Tx antennas. In this case, in a receiver, mutual interference occurs between data transmitted by transmitters at the same time. The receiver receives data after cancelling such interference using a proper signal processing scheme. A noise cancellation method used in this case includes a maximum likelihood detection (MLD) receiver, a zero-forcing (ZF) receiver, a minimum mean square error (MMSE) receiver, diagonal-Bell Laboratories layered space-time (D-BLAST), vertical-Bell Laboratories layered space-time (V-BLAST), etc. In particular, if a transmission stage is aware of channel information, a singular value decomposition (SVD) method, etc. is used.

Third, there is a scheme in which spatial diversity and spatial multiplexing are combined. If only a spatial diversity gain is obtained, a performance improvement gain according to an increase of diversity dimension is gradually saturated. If only a spatial multiplexing gain is obtained, transmission reliability in a radio channel is deteriorated. Methods for obtaining the two gains while solving the problems have been researched. From among, there are methods, such as time-space block code (Double-STTD), time-space BICM (STBICM), etc.

In order to describe the aforementioned communication method in the multi-input multi-output antenna system using a more detailed method, this may be expressed as follows by modeling it mathematically.

First, as shown in FIG. 32, it is assumed that $N_T$ Tx antennas and $N_R$ Rx antennas are present.

First, a transmission signal is described. As described above, if the $N_T$ Tx antennas are present, maximum transmittable information is $N_T$, and this may be indicated using the following vector.

[Equation 13]

$$S=[s_1, s_2, \ldots, s_{N_T}]^T$$

Meanwhile, transmit power may be different in the pieces of transmission information $s_1, s_2, \ldots, s_{NT}$. In this case, if the pieces of transmit power are $P_1, P_2, \ldots, P_{NT}$, transmission information having adjusted transmit power may be indicated using the following vector.

[Equation 14]

$$\hat{s}=[\hat{s}_1, \hat{s}_2, \ldots, \hat{s}_{N_T}]^T = [P_1 s_1, P_2 s_2, \ldots, P_{N_T} s_{N_T}]^T$$

Furthermore, $\hat{S}$ may be expressed as the diagonal matrix P of transmit power as following.

[Equation 15]

$$\hat{s} = \begin{bmatrix} P_1 & \cdots & 0 \\ \vdots & \ddots & \vdots \\ 0 & \cdots & P_{N_T} \end{bmatrix} \begin{bmatrix} s_1 \\ \vdots \\ s_{N_T} \end{bmatrix} = Ps$$

Meanwhile, the information vector $\hat{S}$ having adjusted transmit power is thereafter multiplexed by a weight matrix W, forming $N_T$ transmission signals $x_1, x_2, \ldots, x_{NT}$ that are actually transmitted. In this case, the weight matrix functions to properly distribute transmission information to each antenna based on a transmission channel condition, etc. Such transmission signals $x_1, x_2, \ldots, x_{NT}$ may be expressed using a vector x as follows.

[Equation 16]

$$X = \begin{bmatrix} x_1 \\ \vdots \\ x_{N_T} \end{bmatrix} = \begin{bmatrix} w_{11} & \cdots & w_{1N_T} \\ \vdots & \ddots & \vdots \\ w_{N_T 1} & \cdots & w_{N_T N_T} \end{bmatrix} \begin{bmatrix} \hat{s}_1 \\ \vdots \\ \hat{s}_{N_T} \end{bmatrix} = W\hat{s} = WPs$$

In this case, $w_{ij}$ indicates a weight between an i-th Tx antenna and j-th transmission information. W indicates the weight in a matrix form. Such a matrix W is called a weight matrix or a precoding matrix.

Meanwhile, the aforementioned transmission signal x may be considered to be divided into a case where spatial diversity is used and a case where space multiplexing is used.

In the case where space multiplexing is used, different signals are multiplexed and transmitted, and thus all the elements of the information vector s have different values. In contrast, if spatial diversity is used, all the elements of the information vector s have the same value because the same signal is transmitted through several channel paths.

Of course, a method of mixing space multiplexing and spatial diversity may also be taken into consideration. That is, for example, a case where the same signal is transmitted through 3 Tx antennas using spatial diversity and the remaining different signals are space-multiplexed and transmitted may also be taken into consideration.

Next, if the $N_R$ Rx antennas are present, received signals $y_1, y_2, \ldots, y_{NR}$ of the respective antennas are expressed in the form of a vector y as follows.

[Equation 17]

$$y=[y_1, y_2, \ldots, y_{N_R}]^T$$

Meanwhile, if a channel is modeled in a multi-input multi-output antenna communication system, each channel may be divided depending on a Tx/Rx antenna index. A channel via an Rx antenna i from a Tx antenna j is expressed as $h_{ij}$. In this case, it is to be noted that in the sequence of indices of $h_{ij}$, the index of an Rx antenna first comes and the index of a Tx antenna comes next.

Such some channels may be grouped and expressed in a vector and matrix form. An example of a vector expression is described below.

FIG. 33 is a diagram showing channels from multiple Tx antennas to one Rx antenna.

As shown in FIG. 33, channels from a total of $N_T$ Tx antennas to an Rx antenna i may be expressed as follows.

[Equation 18]

$$h_i^T=[h_{i1}, h_{i2}, \ldots, h_{iN_T}]$$

Furthermore, a case where all of channels via the $N_R$ Rx antennas from the $N_T$ Tx antennas through a matrix expression, such as Equation 18, may be expressed as follows.

[Equation 19]

$$H = \begin{bmatrix} h_1^T \\ \vdots \\ h_{N_R}^T \end{bmatrix} = \begin{bmatrix} h_{11} & \cdots & h_{1N_T} \\ \vdots & \ddots & \vdots \\ h_{N_R 1} & \cdots & h_{N_R N_T} \end{bmatrix}$$

Meanwhile, in an actual channel, additive white Gaussian noise (AWGN) is added through the channel matrix H. Accordingly, white noises $n_1, n_2, \ldots, n_{NR}$ added to the respective $N_R$ Rx antennas are expressed as follows in a vector form.

[Equation 20]

$$n=[n_1, n_2, \ldots, n_{N_R}]^T$$

The transmission signal, received signal, channel, and white noise may have the following relations in a multi-input multi-output antenna communication system through modeling.

[Equation 21]

$$y = \begin{bmatrix} y_1 \\ \vdots \\ y_{N_R} \end{bmatrix} = \begin{bmatrix} h_{11} & \cdots & h_{1N_T} \\ \vdots & \ddots & \vdots \\ h_{N_R 1} & \cdots & h_{N_R N_T} \end{bmatrix} \begin{bmatrix} x_1 \\ \vdots \\ x_{N_T} \end{bmatrix} + \begin{bmatrix} n_1 \\ \vdots \\ n_{N_R} \end{bmatrix} = Hx + n$$

Meanwhile, the number of rows and number of columns of a channel matrix H indicative of the state of a channel are determined by the number of Tx/Rx antennas. As described above, in the channel matrix H, the number of rows becomes equal to the number of Rx antennas $N_R$, and the number of columns becomes equal to the number of Tx antennas $N_T$. That is, the channel matrix H becomes an $N_R \times N_T$ matrix.

In general, the rank of a matrix is defined as a minimum number from among the number of rows and the number of columns that are independent. Accordingly, the rank of a matrix cannot be greater than the number of rows or columns. For example, mathematically, the rank H of the channel matrix H is limited as follows.

[Equation 22]

$$\text{rank}(H) \leq \min(N_T, N_R)$$

Furthermore, when eigen value decomposition is performed on the matrix, the rank may be defined as the number of eigen values other than 0 from among eigen values. As a similar method, when singular value decomposition (SVD) is performed on the rank, the rank may be defined as the number of singular values other than 0. Accordingly, in the channel matrix, a physical meaning of the rank may be said to be a maximum number capable of transmitting different information in a given channel.

In this specification, a "rank" for MIMO transmission indicates the number of paths capable of independently transmitting signals in specific timing and a specific frequency resource, and "the number of layers" indicates the number of signal streams transmitted through each path. In general, a transmission stage transmits layers having a number corresponding to the number of ranks used for signal transmission, and thus one rank has the same meaning as a layer number unless specifically described.

As described above, an NB-IoT system refers to a system for supporting communication between terminals having the characteristics of a low cost and low complexity, which uses a narrowband.

Furthermore, the NB-IoT system takes into consideration a connection situation between multiple terminals using a limited communication resource and aims to support wider coverage than legacy LTE.

In order to obtain an effect of coverage extension through a limited number of resources (e.g., subcarriers), an NB-IoT system takes into consideration an uplink transmission method and repetition method using a single tone or single subcarrier.

If single subcarrier (or tone) transmission is used, a wireless communication system can solve problems, such as the shortage of subcarrier resources, extreme coverage support, etc. in terms of various aspects.

Furthermore, single tone transmission supports $\pi/2$-BPSK modulation and $\pi/4$-QPSK modulation.

Hereinafter, a method of defining (or configuring or designing) a PUSCH frame structure of NB-IoT proposed in this specification is described.

Specifically, this specification provides (1) a method of determining the position of a demodulation (DM)-reference signal (RS) symbol in order to support a narrowband (NB)-PUSCH, (2) a method of generating a DM-RS sequence and mapping it to a symbol by taking into consideration a phase rotation, and (3) a method of configuring an initial phase (of a data symbol or DM-RS symbol for an NB-PUSCH).

Contents and methods proposed in this specification are limited to a PUSCH of NB-IoT and described, for convenience of description, but the contents and methods may also be applied to uplink/downlink data channel and uplink/downlink control channel transmission in all of communication systems using single tone transmission.

In contents described hereunder, single tone transmission of NB-IoT is described as an example, but is not limited thereto and may be applied to multiple tone transmission of NB-IoT.

In this case, multiple tone (or subcarrier) transmission of NB-IoT may use 2, 3, 6 or 12 tones, for example.

Furthermore, a wireless device, a transmitter, a receiver and a transceiver used in this specification means a device capable of transmitting at least one of the transmission of a signal and the reception of a signal, and may include a terminal, a base station, etc.

Furthermore, the wireless device supports an NB-IoT system and can also support the legacy LTE system additionally.

Furthermore, hereinafter, embodiments have been classified for convenience of description, and the embodiments may be combined and implemented or may be independently performed.

First Embodiment: DM-RS Structure for NB-PUSCH Support of NB-IoT

The first embodiment provides contents for a DM-RS structure for supporting an NB-PUSCH in an NB-IoT (or NB-LTE) system.

In this case, the DM-RS structure includes the position of a DM-RS symbol in a slot, a subframe, a radio frame, a resource unit, etc.

Furthermore, in the NB-IoT system, a PUSCH may be used for the transmission of control information in addition to data.

In NB-PUSCH transmission, channel estimation may be performed using a DM-RS for coherent demodulation.

In NB-IoT, a DM-RS needs to be designed by taking into consideration coexistence with a legacy LTE system for supporting an inband scenario (or inband mode).

In particular, if an NB-IoT system operates in the inband mode, the position of a DM-RS within a slot of NB-IoT needs to be designed to avoid a collision with a sounding reference signal (SRS) location of legacy LTE.

Furthermore, a subframe structure of NB-IoT may be the same as or different depending on subcarrier spacing.

That is, a subframe structure of NB-IoT may use the same structure regardless of subcarrier spacing (defined in NB-IoT) or may use a different subframe structure depending on subcarrier spacing.

If the same subframe structure is used regardless of subcarrier spacing, a terminal (e.g., UE) determines the structure of a subframe related to NB-PUSCH transmission through signaling for determining a subframe format (to be described later).

In contrast, if a different subframe structure is used depending on subcarrier spacing, a terminal may determine the structure of a subframe in order to combine and use signaling information for determining a subframe format and signaling information for determining subcarrier spacing.

In NB-IoT, one DM-RS density may be fixed or one of several DM-RS densities may be selected and used.

In this case, the DM-RS density is related to the number of DM-RS symbols in which a DM-RS is transmitted, and may be expressed to have a large or small number of DM-RS symbols.

If several DM-RS densities are supported, each terminal may receive a predefined subframe format through a control signal from a base station (e.g., eNodeB), may select one of the received subframe formats, and may operate.

Hereinafter, various subframe formats for a DM-RS are described in detail.

(1) Format 0 (Short DM-RS Sequence)

Format 0 shows a format using a short DM-RS sequence.

Format 0 may be divided into (1-1) and (1-2) based on spacing in which a DM-RS symbol is allocated. (1-1) and (1-2) may be divided into (1-1a) and (1-1b), and (1-2a) and (1-2b), respectively, depending on the location where a DM-RS symbol within a slot starts.

(1-1) 7 Symbol Spaced DM-RS Symbol Allocation

This method is a method of deploying or allocating DM-RS symbols in a 7-symbol unit as in the existing legacy LTE system.

However, in NB-IoT, subcarrier spacing is 3.75 kHz. If DM-RS symbols are allocated to $4^{th}$ (l=3) and $11^{th}$ (l=10) symbols as in the legacy LTE system, the section in which the position of a DM-RS symbol overlaps the position of an SRS symbol used in the legacy LTE system may occur.

l indicates a symbol index.

An SRS symbol is located in the last symbol, that is, a 14-th symbol (l=13) of each SF.

Accordingly, in an NB-PUSCH, a method of deploying a DM-RS symbol to another symbol position in order to take into consideration coexistence with the legacy LTE system needs to be taken into consideration.

FIG. 34 shows an example of a DM-RS symbol mapping method in NB-IoT proposed in this specification.

That is, FIG. 34 shows a diagram corresponding to the aforementioned (1-1a) and (1-1b).

As in (1-1a) of FIG. 34, a DM-RS may be mapped to the $1^{st}$ and $8^{th}$ symbols of one NB-subframe.

Alternatively, as in (1-1b) of FIG. 34, if a DM-RS symbol is mapped to the $2^{nd}$ and $9^{th}$ symbols of one NB-subframe, a collision with a legacy SRS symbol can be prevented.

In this case, one NB-subframe may include two NB-slots, and each of the NB-slots may include 7 symbols.

The NB-subframe may be expressed as a time unit, time resource, etc. including a plurality of symbols.

(1-2) 6 (or 8) Symbol Spaced DM-RS Symbol Allocation

The (1-2) method is a method of unifying symbol indices within a subframe of a DM-RS symbol as an even number or odd number in order to support a case where a phase rotation is incorporated into a DM-RS symbol.

In this case, the phase rotation may support $\lambda/2$-BPSK and $\lambda/4$-QPSK.

In single tone transmission of an NB-IoT system, $\pi/2$-BPSK and $\lambda/4$-QPSK are supported in order to reduce a peak-to-average power ratio (PAPR)/cubic metric (CM). Accordingly, the structure of DM-RS symbols can be supported by taking into consideration a phase rotation.

In NB-IoT, in order to support $\lambda/2$-BPSK and $\pi/4$-QPSK, a constellation must be rotated $\pi/2$ or $\pi/4$ every symbol. Accordingly, a constellation point used in each symbol is classified depending on whether a symbol index is even or odd.

In order to design (or configure) systems using different constellations, a DM-RS sequence needs to be designed by taking into consideration a modulation method and a correlation characteristic that is different depending on whether a (phase) rotation is applied.

If the constellation points of all of DM-RS symbols can be identically aligned, however, a DM-RS sequence can be easily designed because the constellation points can use the existing sequence characteristic.

To this end, a method of aligning the index numbers of DM-RS symbols as an even or odd number is described with reference to (1-2) of FIG. 34.

As shown in FIG. 34, if the index numbers of two symbols are differently "6" and "8" within one subframe, the constellation points of all of DM-RS symbols may be identically aligned.

Each of (1-2a) and (1-2b) of FIG. 34 shows an example of such a DM-RS symbol allocation method.

(1-2a) of FIG. 34 shows that (spaced) DM-RS symbols are deployed in 8 symbol spacing by allocating the DM-RS symbols to $1^{st}$ and $9^{th}$ symbol positions.

(1-2b) of FIG. 34 shows that DM-RS symbols are deployed in 6 symbol spacing by allocating the DM-RS symbol in $2^{nd}$ and $8^{th}$ symbol positions.

(2) Format 1-A (×2 DM-RS Density)

Format 1-A shows an example in which DM-RS density has been doubled compared to Format 0.

That is, Format 1-A shows a DM-RS symbol deployment structure if the number of DM-RS symbols has been doubled compared to Format 0.

If DM-RS density needs to be increased for channel estimation accuracy, the number of DM-RSs necessary for one subframe may increase.

In order to support such a case, a subframe of an NB-PUSCH in which an extended DM-RS sequence has been incorporated needs to be designed.

Accordingly, Format 1 (1-A, 1-B, 1-C) to be described below uses a method of adding additional DM-RS symbols, generated due to an increase of DM-RS density, to the front or rear of a DM-RS symbol position of Format 0.

Format 1-A supports a subframe structure if DM-RS density used in Format 0 is doubled.

FIG. 35 shows another example of a DM-RS symbol mapping method in NB-IoT proposed in this specification.

That is, FIG. 35 shows the positions of DM-RS symbols to the front or rear of which DM-RS symbols have been added in the case of FIG. 34.

Each of (1-1a) and (1-1b) of FIG. 35 shows an example in which one DM-RS symbol has been added at the back of each symbol in each of (1-1a) and (1-1b) of FIG. 34. Each of (1-2a) and (1-2b) of FIG. 35 shows an example in which one DM-RS symbol has been added at the front of each symbol in each of (1-2a) and (1-2b) of FIG. 34.

(3) Format 1-B (×3 DM-RS Density)

Format 1-B shows an example in which DM-RS density has been tripled compared to Format 0.

That is, Format 1-B shows a DM-RS symbol deployment structure if the number of DM-RS symbols is increased three times compared to Format 0.

FIG. 36 shows yet another example of a DM-RS symbol mapping method in NB-IoT proposed in this specification.

As shown in FIG. 36, in a system in which (1-1) of Format 0 is used, $3^{rd}$ and $10^{th}$ symbols, and $5^{th}$ and $12^{th}$ symbols may be additionally used for a DM-RS.

As described above, in Format 1-B, the position of a symbol that may be used is limited to avoid a collision with a legacy SRS.

That is, in Format 1-B, the $1^{st} \sim 3^{rd}$ symbols 3610 and $8^{th} \sim 10^{th}$ symbols 3620 of a subframe may be used as DM-RS symbols as in FIG. 36.

In this case, one NB-subframe includes two slots, and each slot may have 7 symbols.

Accordingly, DMRS symbols in Format 1-B are positioned in 3 symbols in the first of each slot, and the 3 symbols in the first indicate the first symbol, second symbol and third symbol of a slot.

In DM-RS symbol positions, such as Format 1-B, if orthogonal cover code (OCC) is taken into consideration, the OCC needs to be designed by taking into consideration the influence of a phase rotation.

Single tone transmission of NB-IoT uses a phase rotation scheme in which a reference constellation point varies in each symbol in order to improve the PAPR and CM performance.

In this case, although contiguous two symbols indicate the same value, different values may be expressed due to the influence of a phase rotation. If the existing method of expressing OCC is applied without any change, the characteristics of OCC may not be maintained.

For example, if an orthogonal sequence used in the normal CP conditions of the (legacy LTE) PUCCH formats 1, 1a is reused without any change, the characteristics of OCC may be broken due to the influence of the phase rotation of a second DM-RS symbol.

Table 8 is a table showing an example of orthogonal sequences applied to the legacy LTE PUCCH formats 1, 1a and 1b.

TABLE 8

| Sequence index $\bar{n}_{sc}^{(\tilde{p})}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

In order to prevent the characteristics of OCC from being broken due to a phase rotation, single tone transmission of NB-IoT needs to be designed by taking into consideration the influence of a phase rotation in the design of OCC.

As described in FIG. 36, in the case of the contiguous 3 symbols, the first and the third symbols use the same phase rotation, but the second symbol has a different phase rotation value.

For example, if pi/2 BPSK modulation is used, the second symbol has a phase difference of pi/2.

In this case, pi indicates π.

In order to maintain the orthogonal property by taking into consideration a rotated phase value, new OCC may be designed in a form in which an effect of a phase rotation has been compensated for in the OCC design of the existing legacy LTE.

In this case, OCC sequences of the existing legacy LTE may be used in DM-RS symbols of NB-IoT.

OCC for the position of a DM-RS symbol of a Format 1-B form using Pi/2-BPSK may have a form, such as Table 10.

TABLE 10

| Sequence index | Orthogonal sequence |
|---|---|
| 0 | [1 1 1] |
| 1 | [1 $e^{j\pi/6}$ $e^{j4\pi/3}$] |
| 2 | [1 $e^{j5\pi/6}$ $e^{j2\pi/3}$] |

(4) Format 1-C (×3 DM-RS Density)

Format 1-C shows yet another example in which DM-RS density has been tripled compared to Format 0.

That is, like Format 1-B, Format 1-C shows a DM-RS symbol deployment structure if the number of DM-RS symbols has been increased three times compared to Format 0.

FIG. 37 shows another example of a DM-RS symbol mapping method in NB-IoT proposed in this specification.

In FIG. 37, in a system using (1-1) of Format 0, three DM-RS symbols are used and a case where OCC is applied is taken into consideration.

If three DM-RS symbols are present within one NB-slot and OCC is applied to distinguish between the three DM-RS symbols, the orthogonal property may not be maintained in terms of the characteristic of single tone transmission to which a phase rotation is applied.

For example, if three DM-RS symbols are contiguously deployed as in Format 1-B, different phase rotations are applied between the contiguous symbols and thus the characteristics of OCC is broken.

In order to prevent such a situation, symbol positions may be determined so that the same phase rotation is applied to three DM-RS symbols within one slot.

Furthermore, the positions may be determined by avoiding a position where an SRS may occur.

If M-PSK modulation is used, when a phase rotation rule applied to an n-th symbol is exp(j*pi/M*(n mod 2)), the same phase rotation value is multiplied between even index symbols or odd index symbols.

In this case, pi means π, and an M value is a modulation order value and may be 2, 4, etc.

The locations of DM-RS symbols may be restricted to use only an even index or odd index using such a characteristic. The location of a DM-RS symbol defined by such a characteristic may not overlap the position of a (legacy LTE) SRS symbol.

As an example in which such a condition is taken into consideration, the positions of DM-RS symbols, such as FIG. 37, may be taken into consideration.

The positions of DM-RS symbols shown in FIG. 37 are $1^{st}$, $3^{rd}$, and $5^{th}$ symbols in each slot. All the corresponding symbols are multiplied by a phase rotation value of the same degree and does not overlap the position of a legacy LTE SRS symbol.

If OCC is applied to the aforementioned positions where multiple DM-RS symbols are determined, a method of taking into consideration the influence of a phase rotation may also be applied to 15 kHz subcarrier spacing in the same manner.

FIG. 38 shows yet another example of a DM-RS symbol mapping method in NB-IoT proposed in this specification.

That is, FIG. 38 shows an example of the locations of three DM-RS symbols in 15 kHz subcarrier spacing.

From FIG. 38, it may be seen that $2^{nd}$, $4^{th}$, and $6^{th}$ symbols within one slot are used as DM-RS symbols.

Second Embodiment: Method of Generating DM-RS Sequence in NB-IoT

The second embodiment provides a method of generating a DM-RS sequence for an NB-PUSCH in an NB-IoT system.

Uplink transmission of NB-IoT supports two modulation methods, that is, π/2-BPSK and π/4-QPSK, in order to support single tone transmission.

Accordingly, uplink transmission of NB-IoT requires the design of a DM-RS sequence for supporting two different transmission modes (single tone transmission of a π/2-BPSK modulation method and single tone transmission of a π/4-QPSK modulation method).

In this case, in the case of single tone transmission of NB-IoT, the size of a base resource unit (RU) includes a total of 8 subframes.

In NB-IoT, one subframe includes 2 slots, and the base RU may include 16 slots.

If a DM-RS sequence is mapped in the time axis, the length of an available DM-RS sequence is restricted to 16.

Accordingly, a ZC-sequence may not be useful for use of a DM-RS sequence.

Furthermore, since NB-IoT is sensitive to PAPR/CM performance, there is a need for the structure or design of a sequence capable of guaranteeing a low PAPR/CM value in NB-IoT.

As described above, uplink single tone transmission of NB-IoT uses the π/2-BPSK and π/4-QPSK modulation methods in order to guarantee a low PAPR/CM.

However, the subframe structure of an NB-PUSCH has a structure in which a DM-RS symbol is located between the positions of symbols for data.

Accordingly, the subframe structure of an NB-PUSCH needs to be designed by taking into consideration the phase rotation of a DM-RS symbol.

To this end, in this specification, when a DM-RS sequence of an NB-PUSCH is generated, a DM-RS sequence based on π/2-BPSK and π/4-QPSK is generated.

In this case, a modulation method of a DM-RS symbol may be the same as a modulation method of a data symbol or may be different from a modulation method of a data symbol according to circumstances.

In NB-IoT, a method of applying a phase rotation to a DM-RS symbol may be divided into (1) a method (first method) of generating the final sequence by generating a base sequence based on common BPSK or QPSK and then applying a phase rotation and (2) a method (second method) of generating a sequence into which a phase rotation has been incorporated by taking into consideration the position of a DM-RS symbol.

The first method has an advantage in that it can be used using the existing method of generating a sequence regardless of the position of a DM-RS symbol, but needs to take into consideration that the characteristic of a sequence, such as a correlation characteristic after a phase rotation is generated, must be maintained.

The second method requires the design of a new sequence in which a correlation characteristic between sequences is taken into consideration if symbol indices within a subframe are not unified as an even number or odd number.

The second method has an advantage in that it can use the existing sequence if symbol indices within a subframe are fixed to an even or odd number.

The first method and second method of applying a phase rotation to a DM-RS symbol are different in a method of generating a DM-RS sequence, but may be the same in the form of a resulting DM-RS sequence.

Hereinafter, a sequence generation method is described based on the first method. In this case, the results of the first method may also be directly applied to a sequence of the second method.

If symbol indices of a DM-RS within a subframe sequentially occur in even and odd numbers, two DM-RS sequences may be allocated to even number DM-RS symbols and odd number DM-RS symbols, respectively.

The corresponding method has advantages in that the correlation property between DM-RS symbols can be maintained and DM-RS symbol allocation of 7 symbol spacing can also be used.

In this specification, the case of an NB-IoT PUSCH using (or supporting) single-tone transmission is described as an example, but the methods proposed in this specification may also be applied to an NB-IoT system using multi-tone (or multi-subcarrier) transmission or other communication systems.

Hereinafter, a phase rotation method for a data symbol and DM-RS symbol through various methods (method 1 to method 4) is described in detail.

Phase rotation information of a DM-RS symbol may be considered to be information known to both transmission and reception devices even without the transmission and reception of additional control information because it is determined by an agreed symbol position.

Accordingly, information of a DM-RS symbol attributable to a phase rotation is not damaged.

A combination of a data symbol modulation method and a DM-RS symbol modulation method may select at least one of the following four methods for each data symbol modulation method and operate.

(Method 1) π/2-BPSK data and π/2-BPSK DM-RS sequence

First, the method 1 is described.

The method 1 is a method of applying π/2-BPSK to both a data symbol and a DM-RS symbol.

That is, in the method 1, if π/2-BPSK modulation is used for data transmission and a π/2-BPSK DM-RS sequence is used for DM-RS transmission, a change in the constellation point of each symbol has a difference of π/2 for each symbol regardless of a data symbol and a DM-RS symbol If a data symbol and a DM-RS symbol use the same BPSK-series in a phase rotation as in the method 1, a PAPR/CM reduction can be minimized.

A method of generating a DM-RS sequence according to the method 1 may be expressed like Equation 23.

$$r_{u,i}(n, m) = e^{j\left(\frac{\varphi(n)\pi}{2} + \frac{\gamma(m)\pi}{2} + \phi(i)\right)}, 0 \le n \le M^{RU} - 1, 1 \le m \le 14 \quad \text{[Equation 23]}$$

In this case, n indicates an index according to the sequence of DM-RS symbols within a sequence. An $M^{RU}$ value is a value to determine the length of the sequence and indicates the number of DM-RS symbols allocated to one subcarrier within a resource unit.

φ(n) is a value previously agreed to define the sequence and may generate multiple sequences by defining different φ(n) values depending on a u value.

In this case, the u value may indicate a sequence group number. For example, the u value may have a value of 0 to 29 (u∈ {0, 1, . . . , 29}).

Furthermore, φ(n) may use a computer generate random binary number and may be defined through sequences of series that satisfy the correlation property such as a PN sequence, orthogonal sequence series such as a Walsh sequence, etc. Table 11 shows an example of a method of defining φ(n).

TABLE 11

| u | φ(0), . . . . . . . , φ(15) | | | | | | | | | | | | | | | |
|---|---|---|---|---|---|---|---|---|---|---|---|---|---|---|---|---|
| 0 | 0 | 1 | 1 | 0 | 1 | 1 | 1 | 0 | 1 | 1 | 1 | 0 | 1 | 1 | 0 | 1 |

Uplink single tone transmission of NB-IoT uses the π/2-BPSK and π/4-QPSK modulation methods.

As described above, in the subframe structure of an NB-PUSCH, a DM-RS symbol is located between the positions of symbols for data. Accordingly, the subframe structure of an NB-PUSCH needs to be designed by taking into consideration a phase rotation of a DM-RS symbol.

Accordingly, a phase rotation method for a data symbol and DM-RS symbol, proposed in this specification, may take into consideration the following four methods.

Furthermore, as another method of generating φ(n), a method of randomly generating a DM-RS symbol in a symbol unit without generating a predefined base sequence may be taken into consideration.

Such a method of generating a DM-RS symbol may be defined as a function of a cell ID and the index number of a time unit, such as a resource unit index, frame index, subframe index, slot index or symbol index.

The generation of a DM-RS and channel estimation is always possible because a function and necessary variables for generating the random generation DM-RS symbol are information known to both an eNodeB and UEs.

Furthermore, if such a method of generating a DM-RS symbol (method of randomly generating a DM-RS symbol in a symbol unit) is used, the generation of a DM-RS symbol suitable for various conditions is possible because the length of a sequence has not been determined.

Furthermore, m means an index number indicated by a symbol within one subframe or within a time unit in which a phase rotation is performed.

$\gamma(m)$ is a value for expressing a phase rotation attributable to a symbol index within a subframe and may have a value of 1 or 0 depending on whether the index of a symbol is even or odd.

A formula expression of $\gamma(m)$ may be defined like Equation 24.

[Equation 24]

$$\gamma(m) = 1 - \mathrm{mod}(m, 2)$$

Alternatively, $\gamma(m)$ may be a value to express the index of a symbol within a subframe index.

In this case, the m value starts at the point at which a subframe starts and rises up to the point at which the corresponding subframe ends.

Furthermore, a new m value starts at a subframe boundary point at which a corresponding subframe ends and a new subframe starts.

For example, if 14 OFDM symbols are present within one subframe, $\gamma(m)$ may be expressed using Equation 25.

[Equation 25]

$$\gamma(m) = m, \; m = 1, \ldots, 14$$

Alternatively, $\gamma(m)$ may be a function having a combination of a subframe (or slot) index and a symbol index.

In this case, the m value may be determined to be a value including a combination of a subframe (or slot) index and a symbol index.

If the value of the subframe index is defined to be p and the value of the symbol index is defined to be q, the value of $\gamma(m)$ may be expressed as a function of p and q.

For example, if $N_{SF}$ OFDM symbols are present within one subframe, $\gamma(m)$ may be expressed using Equation 26.

[Equation 26]

$$\gamma(m) = m = N_{SF}(p-1) + q, \; p = 1, 2, \ldots \; q = 1, \ldots, N_{SF}$$

In this case, if the m value is expressed as a combination of a slot index and a symbol index, when $N_{Slot}$ OFDM symbols are present in one slot, $\gamma(m)$ may be expressed using Equation 27.

[Equation 27]

$$\gamma(m) = m = N_{Slot}(p-1) + q, \; p = 1, 2, \ldots \; q = 1, \ldots, 7$$

In such setting of $\gamma(m)$, if the transmission of a terminal (e.g., UE) is not continuous, a rule to determine $\gamma(m)$ before or after discontiguous transmission may be determined.

Such a situation may be applied to all of common cases where a terminal temporarily stops transmission and performs retransmission (or transmission again) after a specific time unit.

For example, the discontiguous transmission situation may include a continuity restriction to an UL resource according to a TDD structure, subframe allocation for a PRACH, the position of an unavailable subframe set by a system, and the restriction of contiguous transmission attributable to a measurement gap, etc.

As one method for determining a method of calculating $\gamma(m)$ in the discontiguous transmission, a method of newly starting the calculation of $\gamma(m)$ at the point at which the transmission of a terminal starts again after it stops may be taken into consideration.

Alternatively, another method may include a method of performing the calculation by taking into consideration a time unit in which $\gamma(m)$ has been accumulated at the point at which transmission starts again while continuing to take into consideration the interval of a time unit, such as a subframe number or symbol number, even in the section in which transmission has stopped.

In this case, a subframe index or symbol index may be determined by a system frame number (SFN).

$\emptyset(i)$ is a value to set an initial phase and indicates a value to determine the phase rotation value of the first symbol of a unit in which a phase rotation is performed.

(Method 2) $\pi/2$-BPSK Data and $\pi/4$-QPSK DMRS Sequence

The method 2 is described below.

The method 2 is a method of applying $\pi/2$-BPSK to a data symbol and $\pi/4$-QPSK to a DM-RS symbol.

In the method 2, that is, in the method of using $\pi/2$-BPSK data modulation and $\pi/4$-QPSK DM-RS modulation, two methods (first method and second method) may be basically taken into consideration.

(1) The first method is a method of maintaining a symbol without performing a phase rotation on a DM-RS symbol if $\pi/2$-BPSK modulation is used for data transmission and a $\pi/4$-QPSK DM-RS sequence is used for DM-RS transmission.

This is for reducing a PAPR/CM value by preventing the occurrence of zero crossing.

A method of generating a DM-RS sequence according to the first method of the method 2 may be expressed like Equation 28.

[Equation 28]

$$r_{u,i}(n) = e^{j\left(\frac{\varphi(n)\pi}{4} + \Phi(i)\right)}, \; 0 \leq n \leq M^{RU} - 1$$

In this case, n indicates an index according to the sequence of DM-RS symbols within a sequence, and an $M^{RU}$ value is a value to determine the length of the sequence and indicates the number of DM-RS symbols allocated to one subcarrier within a resource unit.

$\varphi(n)$ is a value previously agreed to define the sequence and may generate multiple sequences by defining different $\varphi(n)$ values depending on a u value.

In this case, the u value may indicate a sequence group number. For example, the u value may have a value of 0 to 29 ($u \in \{0, 1, \ldots, 29\}$).

Furthermore, $\varphi(n)$ may use a computer generate random binary number, and may be defined through sequences of series that satisfy the correlation property such as a PN sequence, orthogonal sequence series such as a Walsh sequence, etc. Table 12 shows an example of a method of defining $\varphi(n)$.

TABLE 12

| u | φ(0), . . . . . . . , φ(15) |
|---|---|
| 0 | −1  3  1  3  3  −3  −1  1  −3  3  3  −1  3  1  −1  −3 |

Furthermore, as another method of generating φ(n), a method of randomly generating a DM-RS symbol in a symbol unit without using a predefined base sequence may be taken into consideration.

Such a method of generating a DM-RS symbol may be defined as a function of a cell ID and the index number of a time unit, such as a resource unit index, frame index, subframe index, slot index or symbol index.

The generation of a DM-RS and channel estimation is always possible because a function and necessary variables for generating the random generation DM-RS symbol are information known to both an eNodeB and UEs.

Instead, in order to satisfy continuity with π/2-BPSK modulation, only a group including only 1 and −3 or −1 and 3 is selected and used as the value of φ(n).

$$A + \frac{\pi}{4}$$

value is a value for aligning a constellation point with a π/2-BPSK data symbol and may be excluded.

Table 13 shows an example of a method of defining φ(n).

TABLE 13

| u | φ(0), . . . . . . . , φ(15) |
|---|---|
| 0 | −1  3  −1  3  3  3  −1  −1  3  3  3  −1  3  3  −1  3 |
| 1 |  1  −3  1  1  −3  −3  −3  1  1  −3  1  −3  −3  1  1  −3 |

Furthermore, if such a method of generating a DM-RS symbol (method of randomly generating a DM-RS symbol in a symbol unit) is used, the generation of a DM-RS symbol suitable for various conditions is possible because the length of a sequence has not been determined.

(2) The second method is a method of selecting sequences in which a base sequence satisfies BPSK characteristics from among DM-RS sequences generated through π/4-QPSK modulation and using the selected sequences as π/2-BPSK DM-RS sequence.

The second method has an advantage in that a phase rotation operation can be continuously performed identically from the viewpoint of a terminal while unifying DM-RS base sequence generation methods into one regardless of a data symbol modulation method.

A method of generating a DM-RS sequence according to the second method of the method 2 may be expressed like Equation 29.

$$r_{u,i}(n,m) = e^{j\left(\frac{\varphi(n)\pi}{4} + \frac{\pi}{4} + \frac{\gamma(m)\pi}{2} + \Phi(i)\right)}, \quad [\text{Equation 29}]$$

$$0 \leq n \leq M^{RU} - 1, 1 \leq m \leq 14$$

In this case, n indicates an index according to the sequence of DM-RS symbols within a sequence. An $M^{RU}$ value is a value to determine the length of the sequence and indicates the number of DM-RS symbols allocated to one subcarrier within a resource unit.

φ(n) is a value previously agreed to define the sequence and may generate multiple sequences by defining different φ(n) values depending on a u value.

In this case, the u value may indicate a sequence group number. For example, the u value may have a value of 0 to 29 (u∈{0, 1, . . . , 29}).

Furthermore, φ(n) may use a computer generate random binary number, and may be defined through sequences of series that satisfy the correlation property such as a PN sequence, orthogonal sequence series such as a Walsh sequence, a sequence using a modified form of a DFT matrix, etc.

Furthermore, as another method of generating φ(n), a method of randomly generating a DM-RS symbol in a symbol unit without using a predefined base sequence may be taken into consideration.

Such a method of generating a DM-RS symbol may be defined as a function of a cell ID and the index number of a time unit, such as a resource unit index, frame index, subframe index, slot index or symbol index.

The generation of a DM-RS and channel estimation is always possible because a function and necessary variables for generating the random generation DM-RS symbol are information known to both an eNodeB and UEs.

Furthermore, if such a method of generating a DM-RS symbol (method of randomly generating a DM-RS symbol in a symbol unit) is used, the generation of a DM-RS symbol suitable for various conditions is possible because the length of a sequence has not been determined.

Furthermore, m means an index number indicated by a symbol within one subframe or within a time unit in which a phase rotation is performed.

γ(m) is a value for expressing a phase rotation attributable to a symbol index within a subframe, and may have a value of 1 or 0 depending on whether the index of a symbol is even or odd.

A formula expression of γ(m) may be defined like Equation 30.

[Equation 30]

$$\gamma(m) = 1 - \text{mod}(m, 2)$$

Alternatively, γ(m) may have one of values of 0, 1, 2, and 3 depending on a method of designing a system performing a phase rotation.

In this case, the formula expression of γ(m) may be defined like Equation 31.

In this case, in the method of a phase rotation, a DM-RS phase rotation method with a UE using a π/4-QPSK data symbol and a π/4-QPSK DM-RS symbol may be made identical although it is different from a data symbol part.

[Equation 31]

$$\gamma(m)=[4-\text{mod}(m, 4)]/2$$

Alternatively, γ(m) is a value to express the index of a symbol within a subframe index.

In this case, the m value starts at the point at which a subframe starts and rises up to the point at which the corresponding subframe ends.

Furthermore, a new m value starts at a subframe boundary point at which a corresponding subframe ends and a new subframe starts.

For example, if 14 OFDM symbols are present within one subframe, γ(m) may be expressed using Equation 32.

[Equation 32]

$$\gamma(m)=m, m=1, \ldots, 14$$

Alternatively, γ(m) may be a function including a combination of a subframe (or slot) index and a symbol index.

In this case, the m value may be determined to be a value including a combination of a subframe (or slot) index and a symbol index.

If the value of the subframe index is defined to be p and the value of the symbol index is defined to be q, the value of γ(m) may be expressed as a function of p and q.

For example, if $N_{SF}$ OFDM symbols are present within one subframe, γ(m) may be expressed using Equation 33.

[Equation 33]

$$\gamma(m)=m=N_{SF}(p-1)+q, p=1,2, \ldots q=1, \ldots, N_{SF}$$

In this case, if the m value is expressed as a combination of a slot index and a symbol index, when $N_{Slot}$ OFDM symbols are present within one slot, γ(m) may be expressed using Equation 34.

[Equation 34]

$$\gamma(m)=m=N_{Slot}(p-1)+q, p=1,2, \ldots q=1, \ldots, 7$$

In such setting of γ(m), if the transmission of a terminal (e.g., UE) is not contiguous, a rule to determine γ(m) before or after discontiguous transmission may be determined.

Such a situation may be applied to all of common cases in which a terminal temporarily stops transmission and performs retransmission (or transmission again) after a specific time unit.

For example, the situation of the discontiguous transmission may include a continuity restriction to an UL resource according to a TDD structure, subframe allocation for a PRACH, the position of an unavailable subframe set by a system, and the restriction of contiguous transmission attributable to a measurement gap, etc.

As one method for determining a method of calculating γ(m) in the discontiguous transmission, a method of newly starting the calculation of γ(m) at the point at which the transmission of a terminal starts again after it is stopped may be taken into consideration.

Alternatively, another method may include a method of performing the calculation by taking into consideration a time unit in which γ(m) has been accumulated at the point at which transmission starts again while continuing to take into consideration the interval of a time unit, such as a subframe number or symbol number, even in the section in which transmission has stopped.

In this case, a subframe index or symbol index may be determined by a system frame number (SFN).

∅(i) is a value to set an initial phase and indicates a value to determine the phase rotation value of the first symbol of a unit in which a phase rotation is performed.

(Method 3) π/4-QPSK Data and π/2-BPSK DMRS Sequence

The method 3 is described below.

The method 3 is a method of applying π/4-QPSK to a data symbol and π/2-BPSK to a DM-RS symbol.

That is, in the method 3, if π/4-QPSK modulation is used for data transmission and a π/2-BPSK DM-RS sequence is used for DM-RS transmission, a change in the constellation point of each symbol has a difference of π/4 in each symbol regardless of a data symbol and a DM-RS symbol.

This is for reducing a PAPR/CM value by preventing the occurrence of zero crossing.

According to the method 3, a method of generating a DM-RS sequence may be expressed like Equation 35.

$$r_{u,i}(n, m) = e^{j\left(\frac{\varphi(n)\pi}{2}+\frac{\gamma(m)\pi}{4}+\Phi(i)\right)}, 0 \le n \le M^{RU}-1, 1 \le m \le 14 \quad \text{[Equation 35]}$$

In this case, n indicates an index according to the sequence of DM-RS symbols within a sequence. An $M^{RU}$ value is a value to determine the length of the sequence and indicates the number of DM-RS symbols allocated to one subcarrier within a resource unit.

φ(n) is a value previously agreed to define the sequence and may generate multiple sequences by defining different φ(n) values depending on a u value.

In this case, the u value may indicate a sequence group number. For example, the u value may have a value of 0 to 29 (u∈ {0, 1, . . . , 29}).

Furthermore, φ(n) may use a computer generate random binary number and may be defined through sequences of series that satisfy the correlation property such as a PN sequence, orthogonal sequence series such as a Walsh sequence, etc.

Table 14 shows an example of a method of defining φ(n).

TABLE 14

| u | φ(0), . . . . . . , φ(15) | | | | | | | | | | | | | | | |
|---|---|---|---|---|---|---|---|---|---|---|---|---|---|---|---|---|
| 0 | 0 | 1 | 1 | 0 | 1 | 1 | 1 | 0 | 1 | 1 | 1 | 0 | 1 | 1 | 0 | 1 |

Furthermore, as another method of generating φ(n), a method of randomly generating a DM-RS symbol in a symbol unit without using a predefined base sequence may be taken into consideration.

Such a method of generating a DM-RS symbol may be defined as a function of a cell ID and the index number of a time unit, such as a resource unit index, frame index, subframe index, slot index or symbol index.

The generation of a DM-RS and channel estimation is always possible because a function and necessary variables for generating a random generation DM-RS symbol are information known to both an eNodeB and UEs.

Furthermore, if such a method of generating a DM-RS symbol (method of randomly generating a DM-RS symbol in a symbol unit) is used, the generation of a DM-RS symbol suitable for various conditions is possible because the length of the sequence has not been determined.

Furthermore, m means an index number indicated by a symbol within one subframe or within a time unit in which a phase rotation is performed.

$\gamma(m)$ is a value for expressing a phase rotation attributable to a symbol index within a subframe, and may have a value of 1 or 0 depending on whether the index of a symbol is even or odd.

A formula expression of $\gamma(m)$ may be defined like Equation 36.

[Equation 36]

$$\gamma(m)=1-\mathrm{mod}(m, 2)$$

Alternatively, $\gamma(m)$ may have one of values of 0, 1, 2, and 3 depending on a method of designing a system that performs a phase rotation.

In this case, the formula expression of $\gamma(m)$ may be defined like Equation 37.

In this case, in the method of a phase rotation, a DM-RS phase rotation method with a UE using a $\pi/4$-QPSK data symbol and a $\pi/4$-QPSK DM-RS symbol may be made identical although it is different from a data symbol part.

[Equation 37]

$$\gamma(m)=[4-\mathrm{mod}(m, 4)]/2$$

Alternatively, $\gamma(m)$ may be a value to express the index of a symbol within a subframe index.

In this case, the m value starts at the point at which a subframe starts and rises up to the point at which the corresponding subframe ends.

Furthermore, a new m value starts at a subframe boundary point at which a corresponding subframe ends and a new subframe starts.

For example, if 14 OFDM symbols are present within one subframe, $\gamma(m)$ may be expressed using Equation 38.

[Equation 38]

$$\gamma(m)=m, m=1, \ldots, 14$$

Alternatively, $\gamma(m)$ may be a function including a combination of a subframe (or slot) index and a symbol index.

In this case, the m value may be determined to be a value having a combination of a subframe (or slot) index and a symbol index.

If the value of the subframe index is defined to be p and the value of the symbol index is defined to be q, the value of $\gamma(m)$ may be expressed as a function of p and q.

For example, if $N_{SF}$ OFDM symbols are present within one subframe, $\gamma(m)$ may be expressed using Equation 39.

[Equation 39]

$$\gamma(m)=m=N_{SF}(p-1)+q,\ p=1,2,\ldots q=1,\ldots,N_{SF}$$

In this case, if the m value is expressed as a combination of a slot index and a symbol index, when $N_{Slot}$ OFDM symbols are present within one slot, $\gamma(m)$ may be expressed using Equation 40.

[Equation 40]

$$\gamma(m)=m=N_{Slot}(p-1)+q,\ p=1,2,\ldots q=1,\ldots,7$$

In such setting of $\gamma(m)$, if the transmission of a terminal (e.g., UE) is not continuous, a rule to determine $\gamma(m)$ before or after discontiguous transmission may be determined.

Such a situation may be applied to all of common cases where a terminal temporarily stops transmission and performs retransmission (or transmission again) after a specific time unit.

For example, the situation of the discontiguous transmission may include a continuity restriction to an UL resource according to a TDD structure, subframe allocation for a PRACH, the position of an unavailable subframe set by a system, and the restriction of contiguous transmission attributable to a measurement gap, etc.

As one method for determining a method of calculating $\gamma(m)$ in the discontiguous transmission, a method of newly starting the calculation of $\gamma(m)$ at the point at which the transmission of a terminal starts again after it stops may be taken into consideration.

Alternatively, another method may include a method of performing the calculation by taking into consideration a time unit in which $\gamma(m)$ has been accumulated at the point at which transmission starts again while continuing to take into consideration the interval of a time unit, such as a subframe number or symbol number, even in the section in which transmission has stopped.

In this case, a subframe index or symbol index may be determined by a system frame number (SFN).

$\emptyset(i)$ is a value to set an initial phase and indicates a value to determine the phase rotation value of the first symbol of a unit in which a phase rotation is performed.

The method 3, that is, the method using $\pi/4$-QPSK data modulation and $\pi/2$-BPSK DM-RS modulation, may be a method for unifying methods of generating DM-RS sequences between terminals using different modulation.

Accordingly, the same sequence may be used with a different terminal using $\pi/2$-BPSK data modulation within one cell. A different sequence for only terminals using $\pi/4$-QPSK data modulation may be used.

(Method 4) $\pi/4$-QPSK Data and $\pi/4$-QPSK DMRS Sequence

The method 4 is described below.

The method 4 is a method of applying $\pi/4$-QPSK to both a data symbol and a DM-RS symbol.

That is, in the method 4, if $\pi/4$-QPSK modulation is used for data transmission and a $\pi/4$-QPSK DM-RS sequence is used for DM-RS transmission, a change in the constellation point of each symbol has a difference of $\pi/4$ in each symbol regardless of a data symbol and a DM-RS symbol.

The method 4 is for reducing a PAPR/CM value by preventing the occurrence of zero crossing.

According to the method 4, a method of generating a DM-RS sequence may be expressed like Equation 41.

[Equation 41]

$$r_{u,i}(n, m) = e^{j\left(\frac{\varphi(n)\pi}{4} + \frac{\gamma(m)\pi}{4} + \Phi(i)\right)}, 0 \le n \le M^{RU} - 1, 1 \le m \le 14$$

In this case, n indicates an index according to the sequence of DM-RS symbols within a sequence. An $M^{RU}$ value is a value to determine the length of the sequence and indicates the number of DM-RS symbols allocated to one subcarrier within a resource unit.

$\varphi(n)$ is a value previously agreed to define the sequence.

Multiple sequences are generated according to the u value by defining a different $\varphi(n)$ value.

In this case, the u value may indicate a sequence group number. For example, the u value may have a value of 0 to 29 (u∈{0, 1, . . . , 29}).

Furthermore, φ(n) may use a computer generate random binary number and may be defined through sequences of series that satisfy the correlation property such as a PN sequence, orthogonal sequence series such as a Walsh sequence, etc. Table 15 shows an example of a method of defining φ(n).

TABLE 15

| u | φ(0), . . . . . . . , φ(15) |
|---|---|
| 0 | −1  3  1  3  3  −3  −1  1  −3  3  3  −1  3  1  −1  −3 |

Furthermore, as another method of generating φ(n), a method of randomly generating a DM-RS symbol in a symbol unit without using a predefined base sequence may be taken into consideration.

Such a method of generating a DM-RS symbol may be defined as a function of a cell ID and the index number of a time unit, such as a resource unit index, frame index, subframe index, slot index or symbol index.

The generation of a DM-RS and channel estimation is always possible because a function and necessary variables for generating a random generation DM-RS symbol are information known to both an eNodeB and UEs.

Furthermore, if such a method of generating a DM-RS symbol (method of randomly generating a DM-RS symbol in a symbol unit) is used, the generation of a DM-RS symbol suitable for various conditions is possible because the length of the sequence has not been determined.

Furthermore, m means an index number indicated by a symbol within one subframe or within a time unit in which a phase rotation is performed.

γ(m) is a value for expressing a phase rotation attributable to a symbol index within a subframe, and may have a value of 1 or 0 depending on whether the index of a symbol is even or odd.

A formula expression of γ(m) may be defined like Equation 42.

[Equation 42]

$$\gamma(m)=1-\text{mod}(m, 2)$$

Alternatively, γ(m) may have one of values of 0, 1, 2, and 3 depending on a method of designing a system that performs a phase rotation of a data symbol.

In this case, γ(m) may be defined like Equation 43.

[Equation 43]

$$\gamma(m)=4-\text{mod}(m, 4)$$

Alternatively, γ(m) may be a value to express the index of a symbol within a subframe index.

In this case, the m value starts at the point at which a subframe starts and rises up to the point at which the corresponding subframe ends.

Furthermore, a new m value starts at a subframe boundary point at which a corresponding subframe ends and a new subframe starts.

For example, if 14 OFDM symbols are present within one subframe, γ(m) may be expressed using Equation 44.

[Equation 44]

$$\gamma(m)=m, m=1, \ldots, 14$$

Alternatively, γ(m) may be a function including a combination of a subframe (or slot) index and a symbol index.

In this case, the m value may be determined to be a value having a combination of a subframe (or slot) index and a symbol index.

If the value of a subframe index is defined to be p and the value of a symbol index is defined to be q, the value of γ(m) may be expressed as a function of p and q.

For example, if $N_{SF}$ OFDM symbols are present within one subframe, γ(m) may be expressed using Equation 45.

[Equation 45]

$$\gamma(m)=m=N_{SF}(p-1)+q, p=1,2,\ldots .q=1,\ldots,N_{SF}$$

In this case, if the m value is expressed as a combination of a slot index and a symbol index, when $N_{Slot}$ OFDM symbols are present within one slot, γ(m) may be expressed using Equation 46.

[Equation 46]

$$\gamma(m)=m=N_{Slot}(p-1)+q, p=1,2,\ldots q=1,\ldots,7$$

In such setting of γ(m), if the transmission of a terminal (e.g., UE) is not contiguous, a rule to determine γ(m) before or after discontiguous transmission may be determined.

Such a situation may be applied to all of common cases in which a terminal temporarily stops transmission and performs retransmission (or transmission again) after a specific time unit.

For example, the situation of the discontiguous transmission may include a continuity restriction to an UL resource according to a TDD structure, subframe allocation for a PRACH, the position of an unavailable subframe set by a system, and the restriction of contiguous transmission attributable to a measurement gap, etc.

As one method for determining a method of calculating γ(m) in the discontiguous transmission, a method of newly starting the calculation of γ(m) at the point at which the transmission of a terminal starts again after it is stopped may be taken into consideration.

Alternatively, another method may include a method of performing the calculation by taking into consideration a time unit in which γ(m) has been accumulated at the point at which transmission starts again while continuing to take into consideration the interval of a time unit, such as a subframe number or symbol number, even in the section in which transmission has stopped In this case, a subframe index or symbol index may be determined by a system frame number (SFN).

θ(i) is a value to set an initial phase and indicates a value to determine the phase rotation value of the first symbol of a unit in which a phase rotation is performed.

Third Embodiment: Phase Initialization Method

Next, the third embodiment provides a method of configuring an initial phase in order to support single tone transmission in NB-IoT uplink using π/2-BPSK and π/4-QPSK.

In this case, in order to use both π/2-BPSK modulation and π/4-QPSK modulation, a wireless communication system needs to identically provide both a transmitter and receiver with information regarding that the start point of a phase rotation uses which phase.

This is contents corresponding to both a data symbol and a DM-RS symbol.

Accordingly, a base station needs to determine a method of determining that the symbol of timing when (data or DM-RS) transmission starts uses which phase and a method regarding that an initial phase must be initialized in which cycle and to share them with a terminal.

In this case, the determination of the initial phase (for a data symbol or DM-RS symbol) may occur in unit of each resource unit, and may include a set unit of a frame, subframe, slot, etc. smaller than the unit of each resource unit.

Furthermore, the cycle in which the initial phase is determined may be determined based on the length of a DM-RS sequence, and may be used to newly align a phase rotation after the section in which the transmission of a signal is not performed for a specific time, such as a symbol unit or subframe unit, due to the influence of puncturing during transmission, blocking, etc.

Furthermore, a method of providing notification of the initial phase again may be used when retransmission starts after UL transmission is stopped in TDD.

Furthermore, information of the initial phase may be used as information for performing inter-cell interference randomization.

If a terminal transmits a DMRS through DM-RS symbols using the same tone, same DM-RS sequence as neighboring cells, interference may occur.

In order to avoid such interference, there may be an effect in that inter-cell interference is randomized by making different a phase rotation degree (or value) of a DM-RS used in each cell.

However, if only the constellation points of DM-RS symbols are randomly rotated, there is a problem in that a PAPR/CM between neighboring data symbols increases.

Accordingly, in order to solve the problem, in a method of adjusting an initial phase, the phase rotation degree (or quantity) of all of subframes can be resultantly adjusted.

That is, the method of adjusting an initial phase proposed in this specification proposes a method for each terminal to randomly generate its own initial phase based on its own cell ID in each cycle in which the initial phase is set again.

In this case, the random generation of the initial phase of each terminal may be determined through a slot, subframe, frame index, etc. in addition to a cell ID.

Furthermore, a base station may notify a terminal of a value (or parameter) to determine an initial phase through RRC signaling.

As described above, a method of changing an initial phase value every timing reset using the cycle in which an initial phase is reset has the same effect as that cover code is used in order to solve the aforementioned problem.

Fourth Embodiment: Sequence Timing Offset Compensation Method

One method for removing accurate estimation of a DM-RS sequence and interference is to use orthogonal sequence series, such as a Walsh sequence.

However, such sequences have a disadvantage in that performance thereof cannot be guaranteed if the start point is not accurately synchronized.

For example, if different terminals use the same sequence between two cells, but the sequences are dislocated in some slot unit because they have different start timing, great inter-cell interference acts due to a low cross correlation property.

In order to solve this problem, if the start point of a sequence is dislocated in unit of a slot or more, a method of maintaining an orthogonal property between the sequences of two terminals by compensating for a start point difference between the sequences may be used.

A base station may determine the reference start point of a sequence through the exchange of information with a neighboring cell or an adjacent base station, and may notify terminals of the corresponding start point through signaling.

Each of the terminals that has received the start point may identify how many slots timing when its transmission starts deviates from the reference start point of a sequence (i.e., identify a sequence timing offset), and may use a DM-RS sequence of a time-shifted version in order to compensate for the corresponding difference (or offset).

To this end, the base station notifies the terminals of the reference start point of a sequence through an RRC signaling message or downlink control information.

Such a method of compensating for a sequence timing offset may be used if a sequence of another form is used in addition to an orthogonal sequence form.

FIG. 39 is a flowchart illustrating an example of a method of transmitting and receiving DM-RSs in NB-IoT proposed in this specification.

First, a terminal generates a reference signal sequence used for demodulation with respect to single tone transmission (S3910).

Thereafter, the terminal maps the reference signal sequence to multiple symbols (S3920).

In this case, the reference signal sequence is mapped in the order that the first subcarrier index k increases, in the order that a next symbol index increases, in the order that a next slot index increases, as in a resource element mapping method of an uplink shared channel.

Thereafter, the terminal transmits a DMRS to a base station in the multiple symbols or through the multiple symbols using a single tone (S3930).

The DMRS means a reference signal used for the demodulation of a narrow band (NB) physical uplink channel, and may be called an NB DMRS.

The NB physical uplink channel may transmit at least one of uplink data and control information.

If the NB physical uplink channel is transmitted as a single tone supported in NB-IoT, binary phase shift keying (BPSK) or quadrature phase shift keying (QPSK) is applied to a modulation scheme for the NB physical uplink channel.

Furthermore, the multiple symbols are symbols corresponding to the first symbol, second symbol and third symbol of a slot, respectively. A phase rotation is applied to each of the multiple symbols by taking into consideration a modulation scheme applied to the NB physical uplink channel.

In this case, the phase rotation may be determined based on a first parameter determined according to the modulation scheme (BPSK or QPSK).

In this case, the first parameter may be π/2 or π/4.

Furthermore, the phase rotation may be determined based on the first parameter and a result value obtained by performing modulo operation of 2 on a symbol index indicative of a symbol within a specific time unit.

The equations described in the method 1 and method 4 of the second embodiment may be applied to a detailed equation therefor.

Furthermore, the phase rotation may also be applied to each of data symbols to which the NB physical uplink channel is mapped in addition to the multiple symbols (DMRS symbols).

Furthermore, the DMRS sequence may be generated using a pseudo-random sequence, etc.

The pseudo random sequence may be expressed as a pseudo random noise (PN) sequence.

Additionally, the terminal may apply orthogonal cover code (OCC) to the multiple symbols.

The corresponding step may be performed after step S3910 or after step S3920.

Furthermore, the initial phase value of the phase rotation may be applied at the start of each specific unit.

In this case, the specific unit may be a slot, a subframe, a radio frame, etc.

The initial phase value may be set using at least one of a cell identifier (ID) and the specific unit.

The terminal transmits the DMRS to the base station through a narrow band (NB). The NB has a bandwidth of 180 kHz.

Furthermore, the terminal may transmit the DMRS in the inband mode of the aforementioned operation modes (or operation systems) of NB-IoT.

General apparatus to which the present invention may be applied

FIG. 40 shows an example of the internal block diagram of a wireless communication apparatus to which the methods proposed in this specification may be applied.

Referring to FIG. 40, a wireless communication system includes an eNB 4010 and multiple UEs 4020 located within the area of the eNB 4010.

The eNB 4010 includes a processor 4011, memory 4012 and a radio frequency (RF) unit 4013. The processor 4011 implements the functions, processes and/or methods proposed in FIGS. 1 to 39. The layers of a radio interface protocol may be implemented by the processor 4011. The memory 4012 is connected to the processor 4011 and stores various types of information for driving the processor 4011. The RF unit 4013 is connected to the processor 4011 and transmits and/or receives radio signals.

The UE 4020 includes a processor 4021, memory 4022 and an RF unit 4023. The processor 4021 implements the functions, processes and/or methods proposed FIGS. 1 to 39. The layers of a radio interface protocol may be implemented by the processor 4021. The memory 4022 is connected to the processor 4021 and stores various types of information for driving the processor 4021. The RF unit 4023 is connected to the processor 4021 and transmits and/or receives radio signals.

The memory 4012, 4022 may be inside or outside the processor 4011, 4021 and may be connected to the processor 4011, 4021 by various well-known means.

Furthermore, the eNB 4010 and/or the UE 4020 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention. cl INDUSTRIAL APPLICABILITY The method for transmitting a DMRS in a wireless communication system supporting NB-IoT of this specification has been described based on an example in which it is applied to the 3GPP LTE/LTE-A systems, but may be applied to various wireless communication systems, such as a 5G system, in addition to the 3GPP LTE/LTE-A systems.

What is claimed is:

1. A method of transmitting, by a user equipment, a narrow band (NB) physical uplink channel in a wireless communication system supporting Narrowband-Internet of Things (NB-IoT), the method comprising:
   determining, based on a number of at least one subcarrier in resource unit for the NB physical uplink channel being '1', a binary phase shift keying (BPSK) or a quadrature phase shift keying (QPSK) as modulation scheme for the NB physical uplink channel;
   determining, based on the modulation scheme for the NB physical uplink channel, a phase rotation for each of one or more symbols; and
   transmitting, to a base station, the NB physical uplink channel on the one or more symbols based on the phase rotation.

2. The method of claim 1, wherein the phase rotation is determined based on a first value and a second value,
   wherein the first value is determined based on the modulation scheme, and
   wherein the second value is a value of a modulo operation of 2 for a symbol index, the symbol index indicating a symbol within a specific time unit.

3. The method of claim 2, wherein the first value is $\pi/2$ or $\pi/4$.

4. The method of claim 1, further comprising: transmitting, to the base station, a demodulation reference signal (DMRS).

5. The method of claim 4, wherein a DMRS sequence is generated based on a pseudo-random sequence.

6. The method of claim 4, wherein the transmission of the DMRS is performed in an inband mode of the NB-IoT system.

7. The method of claim 1, wherein an orthogonal cover code (OCC) is applied to the one or more symbols.

8. The method of claim 1, wherein the phase rotation is applied to each of the one or more symbols to which the NB physical uplink channel is mapped.

9. The method of claim 8, wherein an initial phase value of the phase rotation is applied at a start of each specific unit.

10. The method of claim 9, wherein the specific unit is a slot, subframe or radio frame.

11. The method of claim 9, wherein the initial phase value is set based on at least one of a cell identifier (ID) or the specific unit.

12. A user equipment configured to transmit a narrow band (NB) physical uplink channel in a wireless communication system supporting Narrowband-Internet of Things (NB-IoT), the user equipment comprising:

at least one transceiver;

at least one processor; and at least one memory operably connectable to the at least one processor and storing instructions that, based on being executed by the at least one processor, perform operations comprising:

determining, based on a number of at least one subcarrier in resource unit for the NB physical uplink channel being '1', a binary phase shift keying (BPSK) or a quadrature phase shift keying (QPSK) as modulation scheme for the NB physical uplink channel;

determining, based on the modulation scheme for the NB physical uplink channel, a phase rotation for each of one or more symbols; and transmitting, to a base station, the NB physical uplink channel on the one or more symbols based on the phase rotation.

* * * * *